United States Patent
Hirukawa et al.

(10) Patent No.: US 9,410,581 B2
(45) Date of Patent: Aug. 9, 2016

(54) FIXED TYPE CONSTANT VELOCITY UNIVERSAL JOINT

(71) Applicants: Hiroyasu Hirukawa, Shizuoka (JP); Kenta Yamazaki, Shizuoka (JP); Kisao Yamazaki, Shizuoka (JP)

(72) Inventors: Hiroyasu Hirukawa, Shizuoka (JP); Kenta Yamazaki, Shizuoka (JP); Kisao Yamazaki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/353,979

(22) PCT Filed: Oct. 19, 2012

(86) PCT No.: PCT/JP2012/077060
§ 371 (c)(1),
(2) Date: Apr. 24, 2014

(87) PCT Pub. No.: WO2013/069434
PCT Pub. Date: May 16, 2013

(65) Prior Publication Data
US 2014/0309045 A1    Oct. 16, 2014

(30) Foreign Application Priority Data

Nov. 10, 2011 (JP) ................................. 2011-246216

(51) Int. Cl.
*F16D 3/224*  (2011.01)
*F16D 3/24*   (2006.01)
(Continued)

(52) U.S. Cl.
CPC  *F16D 3/24* (2013.01); *F16D 3/223* (2013.01); *F16D 3/224* (2013.01); *F16D 3/2237* (2013.01); *F16D 2003/22309* (2013.01)

(58) Field of Classification Search
CPC ......... F16D 3/24; F16D 3/223; F16D 3/2237; F16D 3/224; F16D 2003/22309; Y10S 464/906

USPC .......................................... 464/144, 145, 906
See application file for complete search history.

(56) References Cited

U.S. PATENT DOCUMENTS 2,321,448 A * 6/1943 Anderson ............... F16D 3/223
                                                   464/144
6,306,044 B1  10/2001 Schwärzler
(Continued)

FOREIGN PATENT DOCUMENTS

CN    1228145     9/1999
CN    1523244     8/2004
(Continued)

OTHER PUBLICATIONS

International Search Report issued Dec. 25, 2012 in International (PCT) Application No. PCT/JP2012/077060.
(Continued)

*Primary Examiner* — Gregory Binda
(74) *Attorney, Agent, or Firm* — Wenderoth, Lind & Ponack, L.L.P.

(57) ABSTRACT

In a fixed type constant velocity universal joint, track grooves of an outer joint member include first and second track groove portions positioned on interior and open sides, respectively. Each of the first track groove portions includes an arc-shaped ball raceway center line having a curvature center prevented from being offset in an axial direction of the outer joint member with respect to a joint center. Planes each including at least the ball raceway center line and the joint center are inclined with respect to a joint axial line with their inclination directions opposite to each other in the first track groove portions, which are adjacent to each other in a peripheral direction of the outer joint member. Each of the second track groove portions includes a ball raceway center line having a straight part when being projected onto corresponding one of the planes.

11 Claims, 19 Drawing Sheets

(51) Int. Cl.
    *F16D 3/2237*     (2011.01)
    *F16D 3/223*     (2011.01)

(56) References Cited

U.S. PATENT DOCUMENTS

| | | | |
|---|---|---|---|
| 6,468,164 B2 * | 10/2002 | Song | F16D 3/2237 |
| | | | 464/144 |
| 8,979,659 B2 * | 3/2015 | Fujio | F16D 3/224 |
| | | | 464/144 |
| 2002/0098894 A1 | 7/2002 | Krude | |
| 2004/0180725 A1 | 9/2004 | Krude | |
| 2008/0096678 A1 | 4/2008 | Yamazaki et al. | |

FOREIGN PATENT DOCUMENTS

| | | |
|---|---|---|
| CN | 100494716 | 6/2009 |
| DE | 10 2007 027 315 | 12/2008 |
| DE | 10 2010 046 887 | 3/2012 |
| EP | 1 450 059 | 8/2004 |
| JP | 2002-181066 | 6/2002 |
| JP | 2005-221033 | 8/2005 |
| JP | 2007-132380 | 5/2007 |
| JP | 2007-309366 | 11/2007 |
| JP | 2008-240970 | 10/2008 |
| JP | 2009-250365 | 10/2009 |

OTHER PUBLICATIONS

Office Action issued Oct. 30, 2015 in corresponding Chinese Application No. 201280055168.1 (with English translation).
International Preliminary Report on Patentability and Written Opinion of the International Searching Authority issued May 22, 2014 in International (PCT) Application No. PCT/JP2012/077060.
Extended European Search Report issued May 27, 2016 in counterpart European Patent Application No. 12847139.8.

* cited by examiner

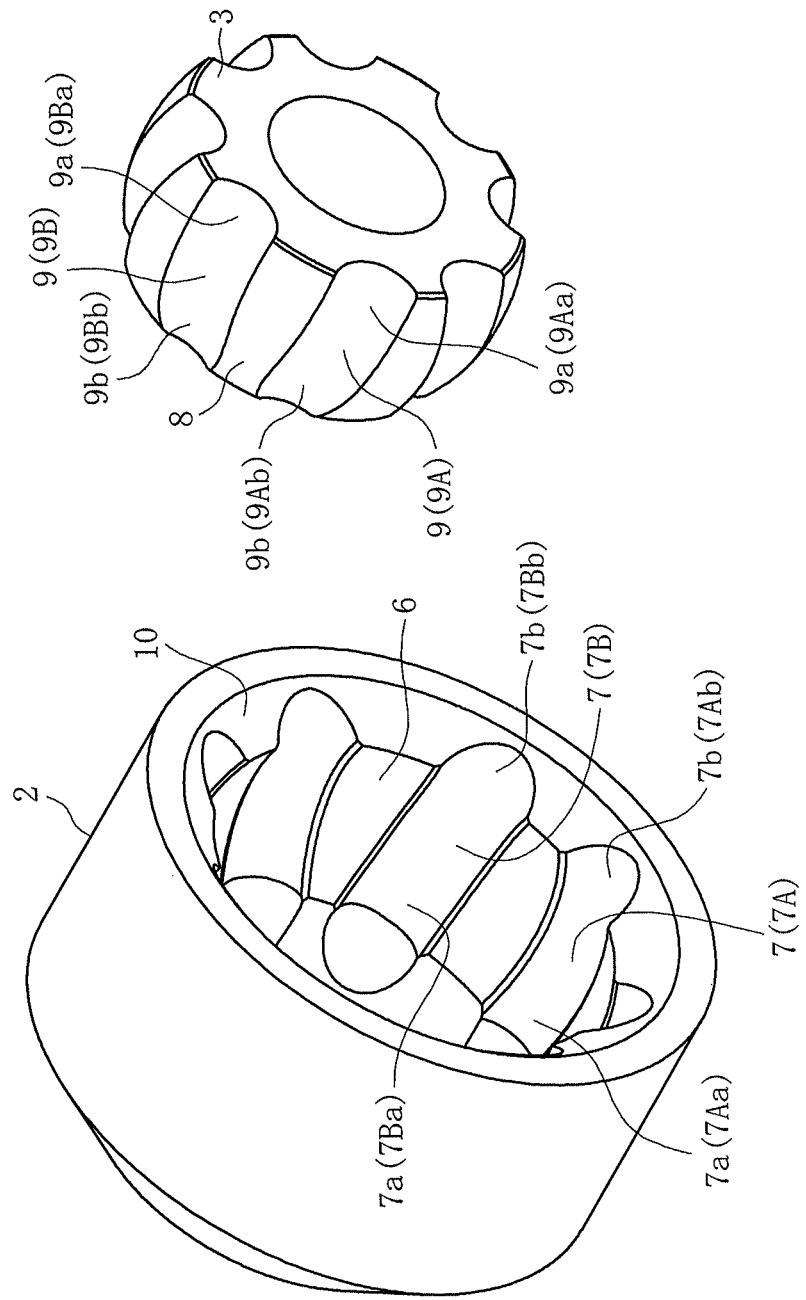

FIXED TYPE CONSTANT VELOCITY UNIVERSAL JOINT

TECHNICAL FIELD

The present invention relates to a fixed type constant velocity universal joint, and more specifically, to a fixed type constant velocity universal joint to be used in a power transmission system of automobiles and various industrial machines, for allowing only angular displacement between two shafts on a driving side and a driven side.

BACKGROUND ART

For example, a plunging type constant velocity universal joint capable of allowing axial displacement while forming an operating angle including a relatively low maximum operating angle is generally assembled on an inboard side (differential side) of an automotive front drive shaft. On an outboard side (wheel side) thereof, a fixed type constant velocity universal joint capable of forming high operating angles while avoiding axial displacement is assembled in consideration of steering of the wheel.

FIG. 21 illustrate a Rzeppa type constant velocity universal joint 101 as an example of the fixed type constant velocity universal joint to be used on the outboard side. FIG. 21a is a vertical sectional view of a state in which the operating angle is 0°, and FIG. 21b is a schematic view of a state in which the maximum operating angle is formed. As illustrated in FIG. 21a, the constant velocity universal joint 101 mainly includes an outer joint member 102, an inner joint member 103, balls 104, and a cage 105. Eight track grooves 107 are formed equiangularly in a spherical inner peripheral surface 106 of the outer joint member 102 to extend along an axial direction. Track grooves 109 opposed to the track grooves 107 of the outer joint member 102 are formed equiangularly in a spherical outer peripheral surface 108 of the inner joint member 103 to extend along the axial direction. The eight balls 104 for transmitting torque are interposed between the track grooves 107 of the outer joint member 102 and the track grooves 109 of the inner joint member 103, respectively. The cage 105 for holding the balls 104 is arranged between the spherical inner peripheral surface 106 of the outer joint member 102 and the spherical outer peripheral surface 108 of the inner joint member 103. An outer periphery of the outer joint member 102 and an outer periphery of a shaft coupled to the inner joint member 103 are covered with a boot, and grease is sealed inside the joint as a lubricant (not shown).

As illustrated in FIG. 21a, the cage 105 has a spherical outer peripheral surface 112 fitted to the spherical inner peripheral surface 106 of the outer joint member 102, and a spherical inner peripheral surface 113 fitted to the spherical outer peripheral surface 108 of the inner joint member 103. The spherical outer peripheral surface 112 and the spherical inner peripheral surface 113 each have a curvature center formed at a joint center O. On the other hand, a curvature center Oo of a ball raceway center line x of each track groove 107 of the outer joint member 102 and a curvature center Oi of a ball raceway center line y of each track groove 109 of the inner joint member 103 are offset in the axial direction by equal distances with respect to the joint center O. Therefore, when the joint forms an operating angle, the balls 104 are always guided in a plane bisecting an angle formed between axial lines of the outer joint member 102 and the inner joint member 103. As a result, rotational torque is transmitted at a constant velocity between the two axes.

As illustrated in FIG. 21b, a maximum operating angle $\theta_{max}$, which is defined as a main function of the fixed type constant velocity universal joint 101, depends on an angle causing interference between an inlet chamfer 110 provided at an opening rim of the outer joint member 102 and a shaft 111. In order to secure permissible torque to be transmitted, an axial diameter d of the shaft 111 is determined for each joint size. When a large inlet chamfer 110 is formed, the length of each track groove 107 of the outer joint member 102, on which the ball 104 is brought into abutment (hereinafter referred to as "effective track length"), is insufficient. As a result, the ball 104 may drop off the track groove 107, and the rotational torque cannot be transmitted. Therefore, how the inlet chamfer 110 is formed while securing the effective track length of the outer joint member 102 is an important factor in securing the operating angle. In the Rzeppa type constant velocity universal joint 101, the curvature center Oo of the ball raceway center line X of the track groove 107 of the outer joint member 102 is offset to an opening side, and hence there is an advantage in terms of the maximum operating angle. However, the maximum operating angle $\theta_{max}$ is approximately 47°.

Further, as compared to a related-art six-ball constant velocity universal joint, the Rzeppa type constant velocity universal joint 101 of an eight-ball type has a smaller track offset amount, a larger number of balls, and has a larger diameter. Thus, it is possible to attain a highly efficient constant velocity universal joint that is lightweight and compact, and is suppressed in torque loss. However, at an operating angle of 0°, wedge angles formed between the opposing track grooves 107 and 109 of the outer joint member 102 and the inner joint member 103 are opened toward the opening side of the outer joint member 102. Therefore, due to axial forces applied from the track grooves 107 and 109, to the balls, loads to be applied to the spherical contact portions 106 and 112 of the outer joint member 102 and the cage 105 and the spherical contact portions 108 and 113 of the inner joint member 103 and the cage 105 are generated in a certain direction. Thus, this structure leads to restriction on achieving even higher efficiency and less heat generation.

In order to achieve even higher efficiency and less heat generation than those can be achieved by the above-mentioned Rzeppa type constant velocity universal joint 101 of the eight-ball type, a fixed type constant velocity universal joint of a track groove crossing type has been proposed (Patent Document 1). FIGS. 22 and 23 illustrate this constant velocity universal joint. FIG. 22 is a vertical sectional view of a state in which the operating angle is 0°, and FIG. 23 are views of a state in which a high operating angle is formed. As illustrated in FIG. 22, a constant velocity universal joint 121 mainly includes an outer joint member 122, an inner joint member 123, balls 124, and a cage 125. The constant velocity universal joint 121 is a constant velocity universal joint of the track groove crossing type. Although illustration is omitted, planes including ball raceway center lines x of eight track grooves 127 of the outer joint member 122 are inclined with respect to a joint axial line n-n with their inclination directions opposite to each other in the track grooves 127 adjacent to each other in a peripheral direction. In addition, each track groove 129 of the inner joint member 123 has a ball raceway center line y, which is formed so as to be mirror-image symmetrical with the ball raceway center line x of the paired track groove 127 of the outer joint member 122 with respect to a plane P including a joint center O at the operating angle of 0°.

In the vertical cross section illustrated in FIG. 22, the track groove 127 formed in a spherical inner peripheral surface 126 of the outer joint member 122 extends into an arc shape along the axial direction, and a curvature center of the track groove 127 is positioned at the joint center O. In a spherical outer peripheral surface 128 of the inner joint member 123, the track groove 129 opposed to the track groove 127 of the outer joint member 122 extends into an arc shape along the axial direction, and a curvature center of the track groove 129 is positioned at the joint center O. The eight balls 124 for transmitting torque are interposed in crossing portions between the track grooves 127 of the outer joint member 122 and the track grooves 129 of the inner joint member 123. The cage 125 for holding the balls 124 is arranged between the spherical inner peripheral surface 126 of the outer joint member 122 and the spherical outer peripheral surface 128 of the inner joint member 123. The cage 125 has a spherical outer peripheral surface 132 fitted to the spherical inner peripheral surface 126 of the outer joint member 122, and a spherical inner peripheral surface 133 fitted to the spherical outer peripheral surface 128 of the inner joint member 123. The spherical outer peripheral surface 132 and the spherical inner peripheral surface 133 each have a curvature center formed at the joint center O. In the constant velocity universal joint 121, curvature centers of the ball raceway center lines x and y of the respective track grooves 127 and 129 of the outer joint member 122 and the inner joint member 123 are not offset in the axial direction with respect to the joint center O. However, the track grooves 127 and 129 thus inclined and opposed cross each other, and the balls 124 are interposed in those crossing portions. Therefore, when the joint forms an operating angle, the balls 124 are always guided in a plane bisecting an angle formed between axial lines of the outer joint member 122 and the inner joint member 123. As a result, rotational torque is transmitted at a constant velocity between the two axes.

In the above-mentioned fixed type constant velocity universal joint 121 of the track groove crossing type, the track grooves 127 of the outer joint member 122 that are adjacent to each other in the peripheral direction are inclined in the opposite directions. Further, the track grooves 129 of the inner joint member 123 that are adjacent to each other in the peripheral direction are inclined in the opposite directions. Therefore, forces in the opposite directions are applied from the balls 124 to pocket portions 125a of the cage 125 that are adjacent to each other in the peripheral direction. Due to the forces in the opposite directions, the cage 125 is stabilized at the position of the joint center O. Thus, a contact force between the spherical outer peripheral surface 132 of the cage 125 and the spherical inner peripheral surface 126 of the outer joint member 122, and a contact force between the spherical inner peripheral surface 133 of the cage 125 and the spherical outer peripheral surface 128 of the inner joint member 123 are suppressed. Accordingly, the joint is smoothly operated under high load and in high speed rotation, and torque loss and heat generation are suppressed. As a result, the durability is enhanced.

The above-mentioned fixed type constant velocity universal joint 121 is excellent as a joint suppressed in heat generation, but has the following problem inherent therein. Detailed description thereof is given with reference to FIG. 23. FIG. 23a is a view of a state in which the above-mentioned constant velocity universal joint forms a high operating angle, and FIG. 23b is an enlarged view of a positional relationship between the track groove 127 of the outer joint member 122 and the ball 124. When the joint forms a high operating angle θ as illustrated in FIG. 23a, a center Ob of the ball 124 moves to a position corresponding to θ/2 with respect to the plane P including the joint center O at the operating angle of 0°. The ball 124 is held in angular contact with the track groove 127 at a contact angle, and hence a contact point between the ball 124 and the track groove 127 is positioned on the broken line of FIG. 23b. In addition, the axial position of the contact point between the ball 124 and the track groove 127 is on a plane t passing through the center Ob of the ball 124 and perpendicular to the ball raceway center line x. In the above-mentioned fixed type constant velocity universal joint 121, when a large inlet chamfer 130 is formed in the outer joint member 122, the ball 124 at the high operating angle θ is positioned on an outer side of the inlet chamfer 130, and hence the ball 124 may drop off the track groove 127. The reason is because the curvature center of the arc-shaped track groove 127 matches with the joint center O and hence an axial distance w between the center Ob of the ball 124 and a contact point s is large, resulting in an insufficient effective track length. Thus, there is a problem in that high operating angles cannot be formed.

PRIOR ART DOCUMENTS

Patent Documents

Patent Document 1: JP 2009-250365 A

SUMMARY OF THE INVENTION

Problems to be Solved by the Invention

In view of the above-mentioned problem inherent in the related art, the inventors have investigated the possibility of employing a straight shape for the track groove on the opening side of the joint center O so as to achieve high operating angles in the fixed type constant velocity universal joint of the track groove crossing type disclosed in Patent Document 1. This constant velocity universal joint corresponds to a constant velocity universal joint illustrated in FIG. 19. FIG. 19a is a vertical sectional view, and FIG. 19b is a right-hand side view of FIG. 19a. As illustrated in FIG. 19a, in a constant velocity universal joint 141, an outer joint member 142 and an inner joint member 143 include track grooves 147 and 149 of a crossing type, respectively. Each track groove 147 of the outer joint member 142 includes a track groove portion 147a provided on an interior side of a joint center O and having an arc-shaped ball raceway center line xa about the joint center O defined as a curvature center, and a track groove portion 147b provided on an opening side of the joint center O and having a straight ball raceway center line xb. On the other hand, each track groove 149 of the inner joint member 143 includes a track groove portion 149b provided on the interior side of the joint center O and having a straight ball raceway center line yb, and a track groove portion 149a provided on the opening side of the joint center O and having an arc-shaped ball raceway center line ya about the joint center O defined as a curvature center.

In addition, as illustrated in FIG. 19b, the track grooves 147 include track grooves 147A and 147B that are inclined in a peripheral direction with respect to a joint axial line and adjacent to each other in the peripheral direction with their inclination directions opposite to each other. Further, the track grooves 149 include track grooves 149A and 149B that are inclined in the peripheral direction with respect to the joint axial line and adjacent to each other in the peripheral direction with their inclination directions opposite to each other. In addition, balls 144 are arranged in crossing portions of the paired track grooves 147A and 149A and the paired track grooves 147B and 149B of the outer joint member 142 and the inner joint member 143. Therefore, when transmitting torque at the operating angle of 0° as illustrated in FIG. 19, an opening direction of a wedge angle formed between the track grooves 147A and 149A and an opening direction of a wedge angle formed between the track grooves 147B and 149B become opposite to each other, and hence forces in the opposite directions are applied from the balls 144 to pocket portions 145a of a cage 145 that are adjacent to each other in the peripheral direction. Due to the forces in the opposite directions, the cage 145 is stabilized at the position of the joint center O. Thus, a contact force between a spherical outer peripheral surface 152 of the cage 145 and a spherical inner peripheral surface 146 of the outer joint member 142, and a contact force between a spherical inner peripheral surface 153 of the cage 145 and a spherical outer peripheral surface 148 of the inner joint member 143 are suppressed. Accordingly, the joint is smoothly operated under high load and in high speed rotation, and torque loss and heat generation are suppressed. As a result, the durability is enhanced.

As described above, in the track groove crossing type, the straight track groove portion 147b is formed on the opening side of the joint center O in the track groove 147 of the outer joint member 142, and hence the effective track length is increased. However, it has been found that, when a frequently used operating angle is formed, there is a problem in terms of suppression of the torque loss and heat generation of the joint. The reason is described with reference to FIG. 20. The track grooves 147 and 149 are generally held in contact with each ball 144 at a contact angle (approximately from 30° to 45°, and hence, as illustrated in FIG. 20, the track grooves 147 and 149 are held in contact with the ball 144 at positions indicated by the broken lines on side surface sides of the track grooves 147 and 149, which are slightly spaced apart from groove bottoms of the track grooves 147 and 149. When the joint forms an operating angle, wedge angle components (not shown) due to the crossing between the track grooves 147 and 149 and wedge angle components a due to expansion between the groove bottoms of the track grooves 147 and 149 in a radial direction of the joint are both applied to the balls 144. Of those wedge angle components, the wedge angle components due to the crossing between the track grooves 147 and 149 are canceled and forces are balanced because the track grooves 147 and 149 are inclined in the directions alternately opposite to each other and hence forces in the opposite directions are applied from the balls 144 to the pocket portions 145a of the cage 145.

However, as illustrated in FIG. 20, in the case of the wedge angle components a due to the expansion between the groove bottoms of the track grooves 147 and 149 in the radial direction of the joint, the balls 144 within phase ranges of from 0° to 90° and from 270° to 360° in FIG. 19b are positioned in the straight track groove portions 147b and 149b. Due to a wedge angle component α1 opened toward the opening side, a force toward the opening side is applied to the balls 144 within those phase ranges. On the other hand, the balls 144 within a phase range of from 90° to 270° are positioned in the arc-shaped track groove portions 147a and 149a. Therefore, a wedge angle component α2, which is generated due to the expansion in the radial direction of the joint, is zero in the balls within this phase range, and hence no push-out force is generated in the balls 144. Thus, when the wedge angle components due to the crossing between the track grooves 147 and 149 and the wedge angle components a due to the expansion between the groove bottoms of the track grooves 147 and 149 in the radial direction of the joint are applied to the balls 144 in combination, the forces applied from the balls 144 to the pocket portions 145a of the cage 145 are not balanced with each other. As a result, there arises a problem in that the contact forces between the spherical contact portions 152 and 146 of the cage 145 and the outer joint member 142 and between the spherical contact portions 153 and 148 of the cage 145 and the inner joint member 143 cannot be suppressed. In particular, it has been found that this problem is serious in terms of suppression of the torque loss and heat generation in a range of the frequently used operating angles including a normal operating angle.

Further, in the constant velocity universal joint 141 illustrated in FIGS. 19 and 20, when the joint axial line n-n is projected onto a plane including the ball raceway center line x and the joint center O, the straight track groove portion 147b is formed in parallel to the joint axial line thus projected. When the joint axial line n-n is projected onto a plane including the ball raceway center line y and the joint center O, on the other hand, the straight track groove portion 149b is formed in parallel to the joint axial line thus projected. Therefore, when the joint forms a high operating angle, the wedge angle formed between the straight track groove portions 147b and 149b is increased. As a result, a force for causing the ball 144 interposed between the straight track groove portions 147b and 149b to jump toward the opening side is increased. Due to this fact, the pocket load of the cage 145 is increased. Thus, it has been found that the strength of the cage 145 at the high operating angle becomes a problem.

In view of the above-mentioned problems, the present invention has an object to provide a compact fixed type constant velocity universal joint that is suppressed in torque loss and heat generation, enhanced in efficiency, capable of forming high operating angles, and is excellent in strength and durability at the high operating angles.

Solutions to the Problems

As a result of various investigations for achieving the above-mentioned object, the inventors of the present invention have arrived at the following novel idea. In order to suppress torque loss and heat generation and to achieve higher efficiency, track grooves are caused to cross each other in a peripheral direction. Further, first track groove portions each comprising an arc-shaped ball raceway center line having a curvature center prevented from being offset in an axial direction with respect to a joint center are provided so as to be adaptable to a range of frequently used operating angles, and second track groove portions each comprising a straight part for increasing an effective track length at a maximum operating angle are provided so as to be adaptable to a range of less frequently used high operating angles. In addition, the inventors of the present invention have arrived at such an idea that a wedge angle between the second track groove portions at high operating angles can be decreased.

As a technical measure to achieve the above-mentioned object, according to one embodiment of the present invention, there is provided a fixed type constant velocity universal joint, comprising: an outer joint member having a spherical inner peripheral surface in which a plurality of track grooves are formed so as to extend in an axial direction of the outer joint member, the outer joint member having an opening side and an interior side spaced apart from each other in the axial direction; an inner joint member having a spherical outer peripheral surface in which a plurality of track grooves are formed so as to be paired with the plurality of track grooves of the outer joint member; a plurality of balls for transmitting torque, the plurality of balls being interposed between the plurality of track grooves of the outer joint member and the plurality of track grooves of the inner joint member; and a cage for holding the plurality of balls, the cage having a spherical outer peripheral surface and a spherical inner peripheral surface, which are fitted to the spherical inner peripheral surface of the outer joint member and the spherical outer peripheral surface of the inner joint member, respectively, wherein the plurality of track grooves of the outer joint member comprise: first track groove portions 7a positioned on the interior side; and second track groove portions 7b positioned on the opening side, wherein each of the first track groove portions 7a comprises an arc-shaped ball raceway center line Xa having a curvature center prevented from being offset in the axial direction with respect to a joint center O, wherein planes M each including at least the arc-shaped ball raceway center line Xa and the joint center O are inclined with respect to a joint axial line N-N with their inclination directions opposite to each other in the first track groove portions 7a, which are adjacent to each other in a peripheral direction of the outer joint member, wherein each of the second track groove portions 7b comprises a ball raceway center line Xb having a straight part when being projected onto corresponding one of the planes M, wherein the straight part is formed in an inclined manner to approach the joint axial line N-N as a distance to the opening side becomes smaller, wherein the arc-shaped ball raceway center line Xa of the each of the first track groove portions 7a comprises an end portion A positioned on the opening side in the axial direction with respect to the joint center O, wherein the ball raceway center line Xb of the each of the second track groove portions 7b is connected to the end portion A, and wherein each of the plurality of track grooves of the inner joint member comprises a ball raceway center line Y, which is formed so as to be mirror-image symmetrical with a ball raceway center line X of corresponding one of the plurality of paired track grooves of the outer joint member with respect to a plane P including the joint center O at an operating angle of 0°. The above-mentioned "joint axial line" herein refers to a longitudinal axial line that is a joint rotation center, and corresponds to a joint axial line N-N in the embodiments described later. The same applies to a joint axial line described in the claims.

With the above-mentioned structure, it is possible to attain the compact fixed type constant velocity universal joint that is suppressed in torque loss and heat generation, enhanced in efficiency, capable of forming high operating angles, and is excellent in strength and durability at the high operating angles. In particular, when the ball raceway center line Xb of the each of the second track groove portions 7b is projected onto the corresponding one of the planes M, the straight part of the ball raceway center line Xb is formed so as to approach the joint axial line N-N as the distance to the opening side becomes smaller. Thus, the wedge angle between the straight track grooves portions 7b and 9b at high operating angles can be decreased, and hence the strength of the cage can be secured.

Specifically, an angle formed by a straight line L connecting the joint center O and the end portion A on the opening side of the arc-shaped ball raceway center line Xa of the each of the first track groove portions 7a with respect to the plane P including the joint center O at the operating angle of 0° is represented by β, and the angle β may be set appropriately depending on usage conditions. The angle β is set to 3° to 10° in consideration of a range of a normal operating angle of the constant velocity universal joint for an automobile, and thus the constant velocity universal joint is widely applicable to various vehicle types. Note that, the angle β is herein defined as the smallest angle among the angles formed by the straight line L with respect to the straight line on the plane P. In addition, the same applies to the embodiments and the claims.

The curvature center of the arc-shaped ball raceway center line Xa of the each of the above-mentioned first track groove portions 7a is arranged on the joint axial line N-N, and thus the track groove depths can be set equal to each other. Alternatively, the curvature center of the arc-shaped ball raceway center line Xa of the each of the first track groove portions 7a is offset in a radial direction of the outer joint member with respect to the joint axial line N-N, and thus the track groove depths on the interior side of the joint can be adjusted, with the result that optimum track groove depths can be secured.

Each of the spherical outer peripheral surface and the spherical inner peripheral surface of the above-mentioned cage has a curvature center offset in the axial direction with respect to the joint center O. Thus, the thickness of the cage is increased as the distance to the opening side becomes smaller, with the result that the strength of the cage can be secured particularly at high operating angles.

An entire region of the ball raceway center line Xb of the each of the above-mentioned second track groove portions 7b may have a straight shape, and the ball raceway center line Xb of the each of the second track groove portions 7b may be formed as a tangential line to the arc-shaped ball raceway center line Xa of the each of the first track groove portions 7a. Thus, the first track groove portions 7a and the second track groove portions 7b can be formed into a simple shape, with the result that the processes can be facilitated and the manufacturing cost can be reduced.

The ball raceway center line Xb of the each of the above-mentioned second track groove portions 7b comprises an arc part having a curvature radius different from a curvature radius of the arc-shaped ball raceway center line Xa of the each of the first track groove portions 7a, and the arc part is connected to the end portion A of the arc-shaped ball raceway center line Xa of the each of the first track groove portions 7a. Thus, the wedge angle between the second track groove portions can be adjusted.

An inclination angle γ of the ball raceway center line Xb of the each of the above-mentioned second track groove portions 7b may gradually be decreased as the distance to the opening side becomes smaller. Further, the straight part of the ball raceway center line Xb of the each of the second track groove portions 7b may be formed in parallel to the joint axial line N-N. Therefore, the interval on the approaching side is increased between the second track groove portions 7b, which are adjacent to each other in the peripheral direction, and the interval on the separating side is decreased therebetween. Thus, differences in intervals can be decreased in the peripheral direction. As a result, a difference in contact area on the opening side between the respective regions of the spherical inner peripheral surface of the outer joint member and a difference in contact area on the interior side between the respective regions of the spherical outer peripheral surface of the inner joint member can be decreased, and hence the spherical contact portions between the cage and the outer joint member and between the cage and the inner joint member can be arranged in a balanced manner. Thus, the fixed type constant velocity universal joint can be operated more smoothly.

The number of the above-mentioned plurality of balls for transmitting torque is set to eight or ten. Thus, it is possible to attain a fixed type constant velocity universal joint and therefore an automotive drive shaft that are lightweight and compact, enhanced in efficiency, and are capable of forming high operating angles.

Advantageous Effects of Invention

According to one embodiment of the present invention, it is possible to attain the compact fixed type constant velocity universal joint that is suppressed in torque loss and heat generation, enhanced in efficiency, capable of forming high operating angles, and is excellent in strength and durability at the high operating angles. In particular, it is possible to decrease the wedge angle between the straight track grooves at the high operating angles, thereby being capable of securing the strength of the cage.

BRIEF DESCRIPTION OF DRAWINGS

FIG. 7b is a partially enlarged view of FIG. 7a.

FIG. 9a is a perspective view of the outer joint member.

FIG. 9b is a perspective view of the inner joint member.

EMBODIMENTS OF THE INVENTION

Embodiments of the present invention are described with reference to FIGS. 1 to 18.

Figure 1B:
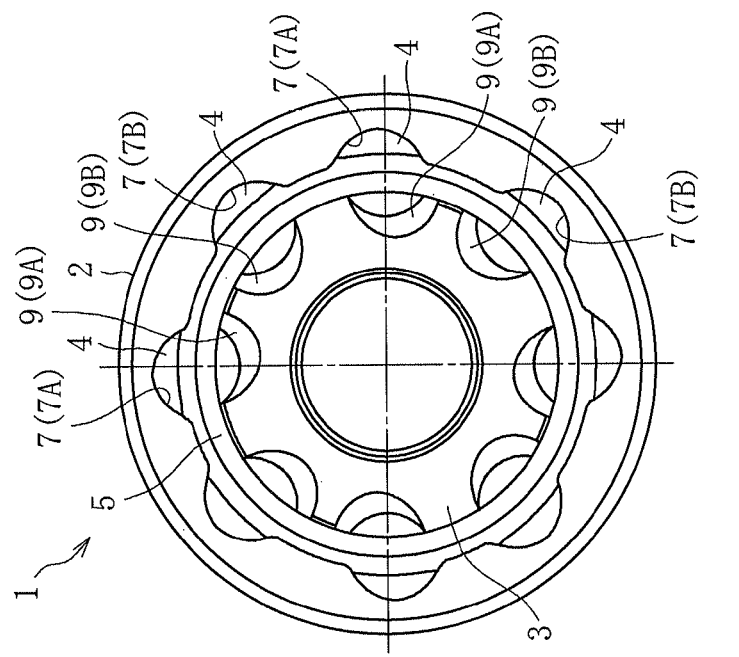
FIG. 1b is a side view of the fixed type constant velocity universal joint.
Figure 1A:
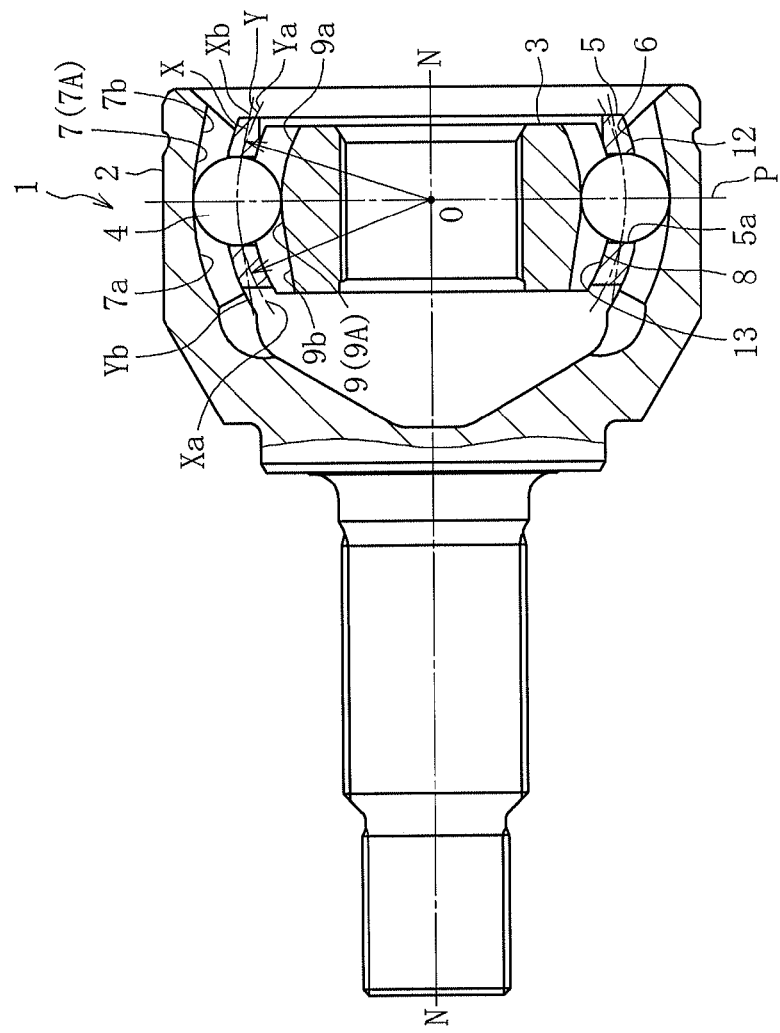
FIG. 1a is a partial vertical sectional view of a fixed type constant velocity universal joint according to a first embodiment of the present invention.

FIGS. 1 to 10 illustrate a first embodiment of the present invention. FIG. 1 illustrate a fixed type constant velocity universal joint according to the first embodiment. FIG. 1a is a partial vertical sectional view, and FIG. 1b is a right-hand side view of FIG. 1a. A constant velocity universal joint 1 according to this embodiment mainly comprises an outer joint member 2, an inner joint member 3, balls 4, and a cage 5. As illustrated in FIGS. 1b, 2, and 3, eight track grooves 7 of the outer joint member 2 comprise track grooves 7A and 7B that are inclined in a peripheral direction with respect to a joint axial line N-N and adjacent to each other in the peripheral direction with their inclination directions opposite to each other. Further, eight track grooves 9 of the inner joint member 3 comprise track grooves 9A and 9B that are inclined in the peripheral direction with respect to the joint axial line N-N and adjacent to each other in the peripheral direction with their inclination directions opposite to each other. In addition, the eight balls 4 are arranged in crossing portions of the paired track grooves 7A and 9A and the paired track grooves 7B and 9B of the outer joint member 2 and the inner joint member 3. Details of the track grooves 7 and 9 are described later.

FIG. 1a illustrates a vertical cross section of the joint. The term "ball raceway center line" is used herein to accurately describe the form and shape of each track groove extending in the axial direction, such as an inclined state and a curved state. The ball raceway center line herein refers to a trajectory of the center of the ball arranged in the track groove at the time of moving along the track groove. Thus, the inclined state of the track groove corresponds to an inclined state of the ball raceway center line, and the arc or straight shape of the track groove corresponds to an arc or straight shape of the ball raceway center line.

As illustrated in FIG. 1a, each track groove 7 of the outer joint member 2 has a ball raceway center line X. The track groove 7 comprises a first track groove portion 7a having an arc-shaped ball raceway center line Xa about a joint center O defined as a curvature center, and a second track groove portion 7b having a straight ball raceway center line Xb. The ball raceway center line Xb of the second track groove portion 7b is smoothly connected to the ball raceway center line Xa of the first track groove portion 7a as a tangential line. On the other hand, each track groove 9 of the inner joint member 3 has a ball raceway center line Y. The track groove 9 comprises a first track groove portion 9a having an arc-shaped ball raceway center line Ya about the joint center O defined as a curvature center, and a second track groove portion 9b having a straight ball raceway center line Yb. The ball raceway center line Yb of the second track groove portion 9b is smoothly connected to the ball raceway center line Ya of the first track groove portion 9a as a tangential line. The curvature centers of the ball raceway center lines Xa and Ya of the first track groove portions 7a and 9a are arranged on the joint center O, that is, on the joint axial line N-N. As a result, the track groove depths can be set equal to each other and the processes can be facilitated. The track grooves 7 and 9 are formed into an elliptical shape or a Gothic arch shape in horizontal cross section, and the track grooves 7 and 9 are held in so-called angular contact with each ball 4 at a contact angle (approximately from 30° to 45°). Thus, the ball 4 is held in contact with side surface sides of the track grooves 7 and 9, which are slightly spaced apart from groove bottoms of the track grooves 7 and 9.

Figure 2B:
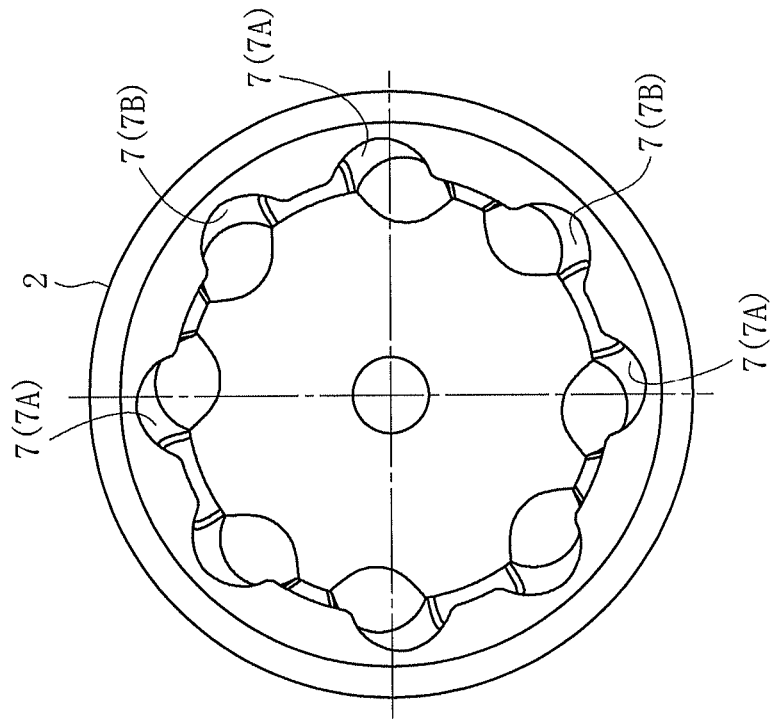
FIG. 2b is a side view of the outer joint member.
Figure 2A:
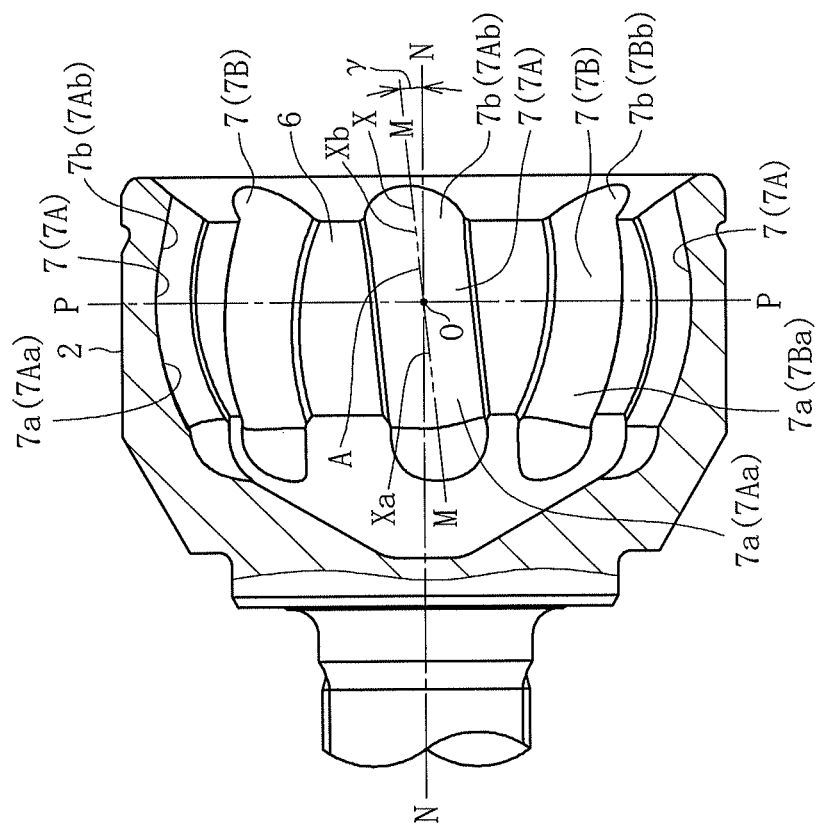
FIG. 2a is a partial vertical sectional view of an outer joint member of the fixed type constant velocity universal joint.

Referring to FIG. 2, detailed description is given of a state in which the track grooves 7 of the outer joint member 2 are inclined in the peripheral direction with respect to the joint axial line N-N. FIG. 2a is a partial vertical sectional view of the outer joint member 2, and FIG. 2b is a right-hand side view of the outer joint member 2. The track grooves 7 of the outer joint member 2 are represented by the reference symbols 7A and 7B to indicate a difference in inclination direction thereof. As illustrated in FIG. 2a, a plane M including the ball raceway center line X of each track groove 7A and the joint center O is inclined at an angle γ with respect to the joint axial line N-N. In addition, in the case of each track groove 7B adjacent to the track groove 7A in the peripheral direction, although illustration is omitted, a plane M including the ball raceway center line X of the track groove 7B and the joint center O is inclined at an angle γ with respect to the joint axial line N-N in an opposite direction to the inclination direction of the track groove 7A. In this embodiment, the entire ball raceway center line X of the track groove 7A, that is, both the ball raceway center line Xa of the first track groove portion 7a and the ball raceway center line Xb of the second track groove portion 7b are formed in the plane M. However, the present invention is not limited thereto, and may be carried out in such an embodiment that only the ball raceway center line Xa of the first track groove portion 7a is included in the plane M. Thus, it is only necessary that the planes M including at least the ball raceway center line Xa of the first track groove portion 7a and the joint center O be inclined with respect to the joint axial line N-N with their inclination directions opposite to each other in the first track groove portions 7a adjacent to each other in the peripheral direction.

Now, supplementary description is given of the reference symbols of the track grooves. Reference symbol 7 represents the track grooves of the outer joint member 2 as a whole, reference symbol 7a represents the first track groove portion, and reference symbol 7b represents the second track groove portion. Further, reference symbols 7A and 7B represent the track grooves distinguished from each other based on the difference in inclination direction, reference symbols 7Aa and 7Ba represent first track groove portions of the respective track grooves 7A and 7B, and reference symbols 7Ab and 7Bb represent second track groove portions of the respective track grooves 7A and 7B. The track grooves of the inner joint member 3 described later are represented by the reference symbols in a similar manner.

Figure 3A:
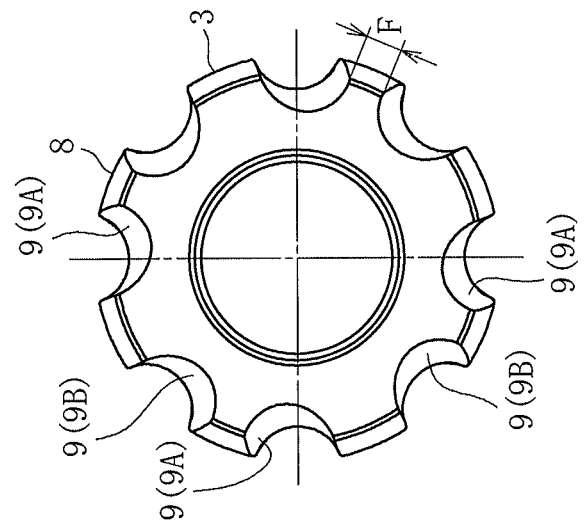
FIG. 3a is a left-hand side view of an inner joint member of the fixed type constant velocity universal joint.
Figure 3B:
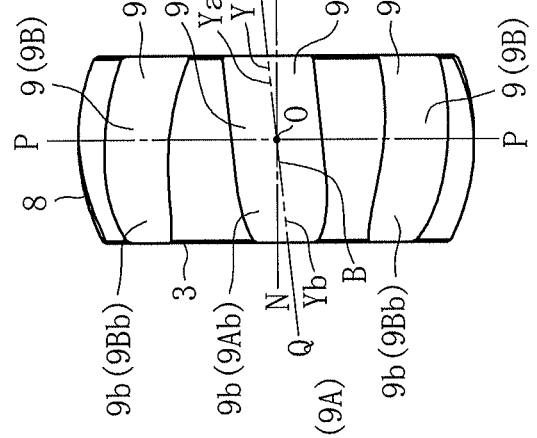
FIG. 3b is a view of an outer peripheral surface of the inner joint member.
Figure 3C:
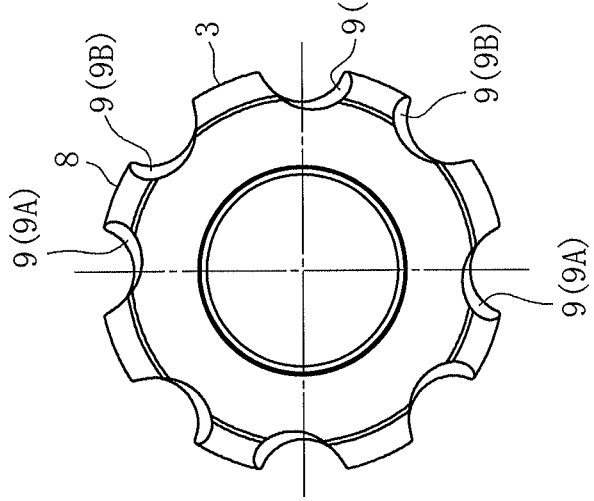
FIG. 3c is a right-hand side view of the inner joint member.

Next, referring to FIG. 3, detailed description is given of a state in which the track grooves 9 of the inner joint member 3 are inclined in the peripheral direction with respect to the joint axial line N-N. FIG. 3b is a view of the outer peripheral surface of the inner joint member 3, FIG. 3a is a left-hand side view of the inner joint member 3, and FIG. 3c is a right-hand side view of the inner joint member 3. The track grooves 9 of the inner joint member 3 are represented by the reference symbols 9A and 9B to indicate a difference in inclination direction thereof. As illustrated in FIG. 3b, a plane Q including the ball raceway center line Y of each track groove 9A and the joint center O is inclined at an angle γ with respect to the joint axial line N-N. In addition, in the case of each track groove 9B adjacent to the track groove 9A in the peripheral direction, although illustration is omitted, a plane Q including the ball raceway center line Y of the track groove 9B and the joint center O is inclined at an angle γ with respect to the joint axial line N-N in an opposite direction to the inclination direction of the track groove 9A. The inclination angle γ is preferably 4° to 12° in consideration of operability of the constant velocity universal joint 1 and a spherical width F between the closest sides of the track grooves of the inner joint member 3. Further, similarly to the outer joint member described above, in this embodiment, the entire ball raceway center line Y of the track groove 9A, that is, both the ball raceway center line Ya of the first track groove portion 9a and the ball raceway center line Yb of the second track groove portion 9b are formed in the plane Q. However, the present invention is not limited thereto, and may be carried out in such an embodiment that only the ball raceway center line Ya of the first track groove portion 9a is included in the plane Q. Thus, it is only necessary that the planes Q including at least the ball raceway center line Ya of the first track groove portion 9a and the joint center O be inclined in the peripheral direction with respect to the joint axial line N-N with their inclination directions opposite to each other in the first track groove portions 9a adjacent to each other in the peripheral direction. The ball raceway center line Y of the track groove 9 of the inner joint member 3 is formed so as to be mirror-image symmetrical with the ball raceway center line X of the paired track groove 7 of the outer joint member 2 with respect to a plane P including the joint center O and being perpendicular to the joint axial line N-N at an operating angle of 0°.

Figure 4:
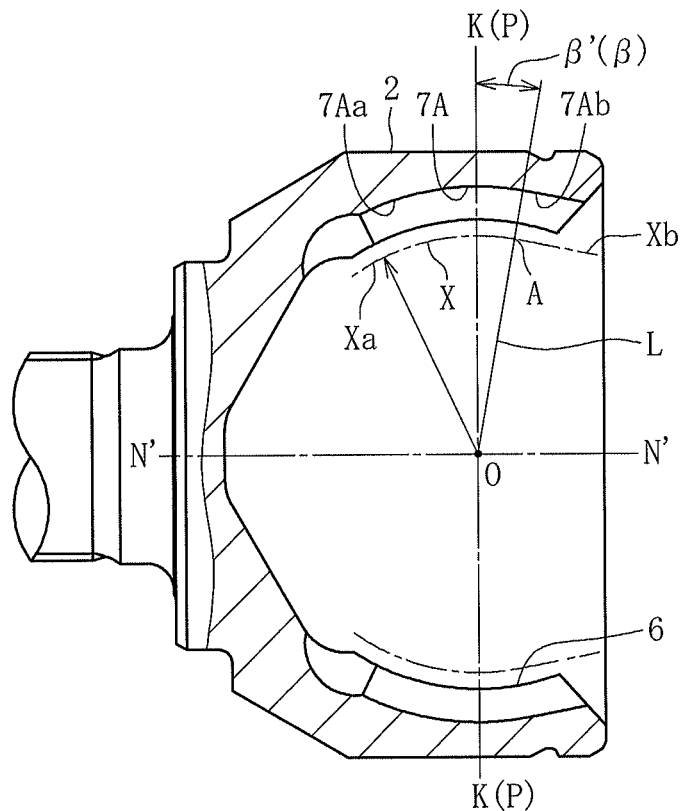
FIG. 4 is a partial vertical sectional view of details of track grooves of the outer joint member.

Referring to FIG. 4, detailed description is given of the track grooves in the view take along the vertical cross section of the outer joint member 2. The partial vertical cross section of FIG. 4 corresponds to a sectional view taken along the above-mentioned plane M of FIG. 2a including the ball raceway center line X of the track groove 7A and the joint center O. Thus, in a strict sense, FIG. 4 is not a vertical sectional view in the plane including the joint axial line N-N, but is a view illustrating a cross section inclined at the angle γ. FIG. 4 illustrates the track groove 7A of the outer joint member 2, and the illustration and description of the track groove 7B are omitted because the inclination direction of the track groove 7B is opposite to that of the track groove 7A and other structural details of the track groove 7B are the same as those of the track groove 7A. A spherical inner peripheral surface 6 of the outer joint member 2 has the track grooves 7A formed along the axial direction. Each track groove 7A has the ball raceway center line X. The track groove 7A comprises the first track groove portion 7Aa having the arc-shaped ball raceway center line Xa about the joint center O defined as a curvature center (with no offset in the axial direction), and the second track groove portion 7Ab having the straight ball raceway center line Xb. In addition, the straight ball raceway center line Xb of the second track groove portion 7Ab is smoothly connected, as a tangential line, to an end portion A on an opening side of the ball raceway center line Xa of the first track groove portion 7Aa. That is, the end portion A is a connecting point between the first track groove portion 7Aa and the second track groove portion 7Ab. The end portion A is positioned on the opening side of the joint center O, and hence the straight ball raceway center line Xb of the second track groove portion 7Ab that is connected, as a tangential line, to the end portion A on the opening side of the ball raceway center line Xa of the first track groove portion 7Aa is formed so as to approach the joint axial line N-N (see FIG. 1a) as the distance to the opening side becomes smaller. Thus, it is possible to secure an effective track length at a maximum operating angle, and to suppress excessive increase in wedge angle.

As illustrated in FIG. 4, L represents a straight line connecting the end portion A and the joint center O. A joint axial line N'-N' projected onto the plane M including the ball raceway center line X of the track groove 7A and the joint center O (see FIG. 2a) is inclined at γ with respect to the joint axial line N-N, and an angle formed between a perpendicular line K and the straight line L with respect to the joint center O on the axial line N'-N' is represented by β'. The above-mentioned perpendicular line K is formed in the plane P including the joint center O at the operating angle of 0°. Thus, an angle β formed by the straight line L with respect to the plane P including the joint center O at the operating angle of 0° satisfies a relationship of sin β=sin β'×cos γ in the present invention.

Figure 5:
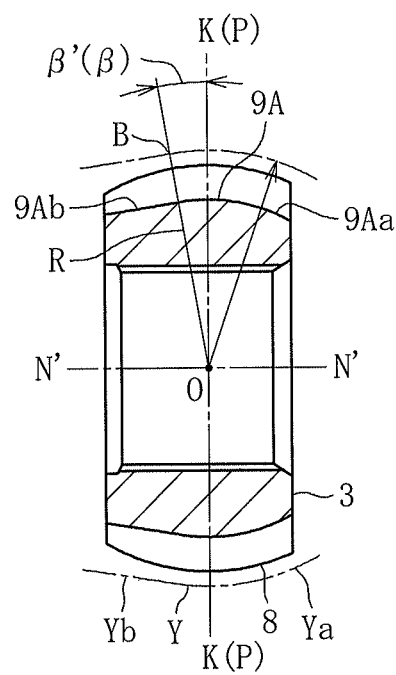
FIG. 5 is a vertical sectional view of details of track grooves of the inner joint member.

Similarly, referring to FIG. 5, detailed description is given of the track grooves in the vertical cross section of the inner joint member 3. The vertical cross section of FIG. 5 corresponds to a sectional view taken along the above-mentioned plane Q of FIG. 3b including the ball raceway center line Y of the track groove 9A and the joint center O. Thus, similarly to FIG. 4, in a strict sense, FIG. 5 is not a vertical sectional view in the plane including the joint axial line N-N, but is a view illustrating a cross section inclined at the angle γ. FIG. 5 illustrates the track groove 9A of the inner joint member 3, and the illustration and description of the track groove 9B are omitted because the inclination direction of the track groove 9B is opposite to that of the track groove 9A and other structural details of the track groove 9B are the same as those of the track groove 9A. A spherical outer peripheral surface 8 of the inner joint member 3 has the track grooves 9A formed along the axial direction. Each track groove 9A has the ball raceway center line Y. The track groove 9A comprises the first track groove portion 9Aa having the arc-shaped ball raceway center line Ya about the joint center O defined as a curvature center (with no offset in the axial direction), and the second track groove portion 9Ab having the straight ball raceway center line Yb. In addition, the ball raceway center line Yb of the second track groove portion 9Ab is smoothly connected, as a tangential line, to an end portion B on an interior side of the ball raceway center line Ya of the first track groove portion 9Aa. That is, the end portion B is a connecting point between the first track groove portion 9Aa and the second track groove portion 9Ab. The end portion B is positioned on the interior side of the joint center O, and hence the straight ball raceway center line Yb of the second track groove portion 9Ab that is connected, as a tangential line, to the end portion B on the interior side of the ball raceway center line Ya of the first track groove portion 9Aa is formed so as to approach the joint axial line N-N (see FIG. 1a) as the distance to the interior side becomes smaller. Thus, it is possible to secure an effective track length at a maximum operating angle, and to suppress excessive increase in wedge angle.

As illustrated in FIG. 5, R represents a straight line connecting the end portion B and the joint center O. A joint axial line N'-N' projected onto the plane Q including the ball raceway center line Y of the track groove 9A and the joint center O (see FIG. 3b) is inclined at γ with respect to the joint axial line N-N, and an angle formed between a perpendicular line K and the straight line R with respect to the joint center O on the axial line N'-N' is represented by β'. The above-mentioned perpendicular line K is formed in the plane P including the joint center O at the operating angle of 0°. Thus, an angle β formed by the straight line R with respect to the plane P including the joint center O at the operating angle of 0° satisfies a relationship of sin β=sin β'×cos γ.

Next, description is given of the angle β formed by each of the straight lines L and R with respect to the plane P including the joint center O at the operating angle of 0°. At an operating angle θ, each ball 4 moves by θ/2 with respect to the plane P including the joint center O in the outer joint member 2 and the inner joint member 3. The angle β is determined based on ½ of a frequently used operating angle, and a contact range of the track groove for the ball 4 is determined within a range of the frequently used operating angle. Now, the frequently used operating angle is defined. First, the normal angle of the joint refers to an operating angle to be formed in a fixed type constant velocity universal joint of a front drive shaft of an automobile with one person onboard when the steering of the automobile is switched to a straightforward mode on a horizontal and flat road surface. In general, the normal angle is selected and determined within a range of from 2° to 15° in accordance with design conditions for vehicle types. In addition, the frequently used operating angle refers to an operating angle to be formed in the fixed type constant velocity universal joint of the above-mentioned automobile during, for example, continuous travel on a curved road, instead of a high operating angle to be formed at the time of, for example, right and left turns at a traffic intersection. This operating angle is also determined in accordance with the design conditions for vehicle types. The frequently used operating angle is supposed to be 20° at maximum. Thus, the angle β formed by each of the straight lines L and R with respect to the plane P including the joint center O at the operating angle of 0° is set to 3° to 10°. Note that, the angle β is not limited to 3° to 10°, and may be set appropriately in accordance with the design conditions for vehicle types. When the angle β is set to 3° to 10°, the fixed type constant velocity universal joint of this embodiment is widely applicable to various vehicle types.

Referring to FIG. 4, due to the above-mentioned angle β, the end portion A of the ball raceway center line Xa of the first track groove portion 7Aa corresponds to a center position of the ball that is moved to the end of the opening side along the axial direction at the frequently used operating angle. Similarly, referring to FIG. 5 in the case of the inner joint member 3, the end portion B of the ball raceway center line Ya of the first track groove portion 9Aa corresponds to a center position of the ball that is moved to the end of the interior side along the axial direction at the frequently used operating angle. With this setting, within the range of the frequently used operating angles, the balls 4 are positioned between the first track groove portions 7Aa and 9Aa of the outer joint member 2 and the inner joint member 3 and between the first track groove portions 7Ba and 9Ba that are inclined in the opposite directions (see FIGS. 2 and 3). Therefore, forces in opposite directions are applied from the balls 4 to pocket portions 5a of the cage 5 that are adjacent to each other in the peripheral direction, and hence the cage 5 is stabilized at the position of the joint center O (see FIG. 1). Thus, a contact force between a spherical outer peripheral surface 12 of the cage 5 and the spherical inner peripheral surface 6 of the outer joint member 2, and a contact force between a spherical inner peripheral surface 13 of the cage 5 and the spherical outer peripheral surface 8 of the inner joint member 3 are suppressed. Accordingly, the joint is smoothly operated under high load and in high speed rotation, and torque loss and heat generation are suppressed. As a result, the durability is enhanced.

In the constant velocity universal joint according to this embodiment, the balls 4 are fitted into the pocket portions 5a of the cage 5 with a clearance. In this case, it is preferred that the clearance be set to approximately 0 μm to 40 μm. When the balls 4 are fitted into the pocket portions 5a with the clearance, the balls 4 held in the pocket portions 5a of the cage 5 can smoothly be operated, and hence the torque loss can further be suppressed.

Figure 6:
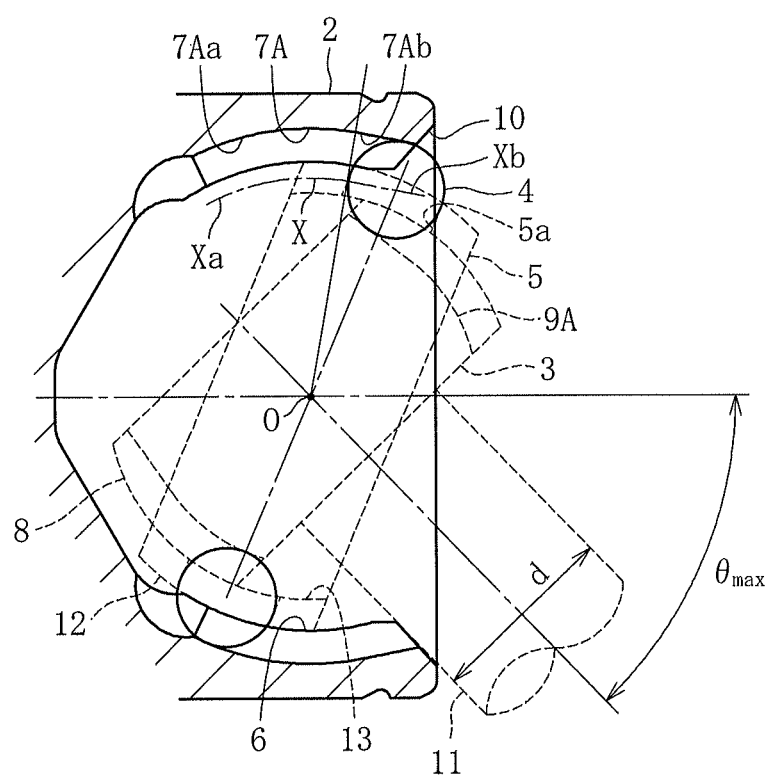
FIG. 6 is a schematic view of a state in which the joint forms a maximum operating angle.

FIG. 6 illustrates a state in which the constant velocity universal joint according to this embodiment forms the maximum operating angle. In each track groove 7A of the outer joint member 2, the second track groove portion 7Ab having the straight ball raceway center line Xb is formed on the opening side. Due to the second track groove portion 7Ab, the effective track length at the maximum operating angle can be secured and the excessive increase in wedge angle can be suppressed in a compact design. Therefore, even when a maximum operating angle $\theta_{max}$ is set as high as approximately 47° as illustrated in FIG. 6, the contact state can be secured between the ball 4 and the track groove portion 7Ab under a state in which an inlet chamfer 10 having a necessary and sufficient size is provided, and the increase in wedge angle can be suppressed.

Note that, in a range of high operating angles, the balls 4 arranged in the peripheral direction are temporarily separately positioned between the first track groove portions 7Aa and 9Aa (7Ba and 9Ba; see FIGS. 2a and 3b) and between the second track groove portions 7Ab and 9Ab (7Bb and 9Bb; see FIGS. 2a and 3b). Along with this, the forces applied from the balls 4 to the pocket portions 5a of the cage 5 are not balanced with each other, and hence the contact forces are generated between the spherical contact portions 12 and 6 of the cage 5 and the outer joint member 2 and between the spherical contact portions 13 and 8 of the cage 5 and the inner joint member 3, respectively. However, the angles in the range of high operating angles are used less frequently, and hence the constant velocity universal joint 1 according to this embodiment is comprehensively capable of suppressing the torque loss and heat generation. Thus, it is possible to attain a compact fixed type constant velocity universal joint that is suppressed in torque loss and heat generation, enhanced in efficiency, capable of forming high operating angles, and is excellent in strength and durability at the high operating angles.

Figure 7B:
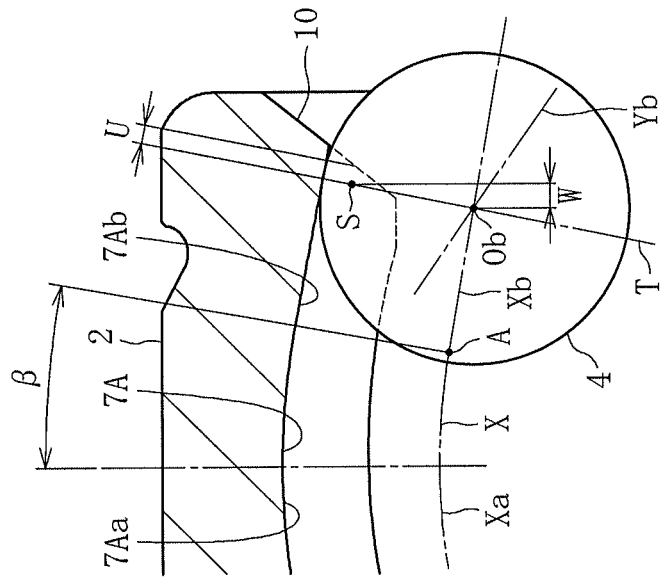
Figure 7A:
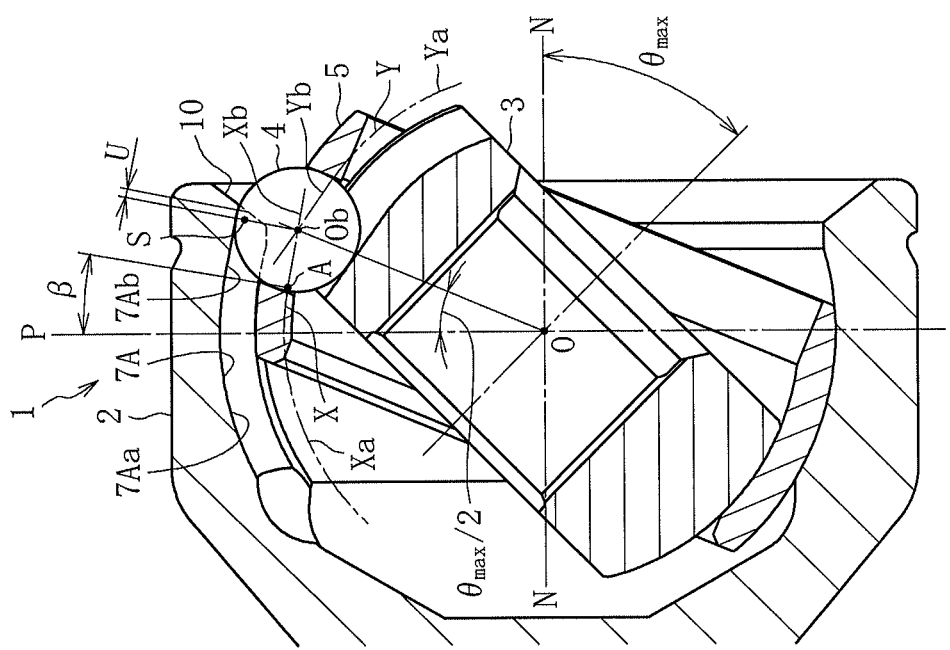
FIG. 7a is a view of a contact state between a ball and the track groove at the time when the joint forms the maximum operating angle.
Figure 23B:
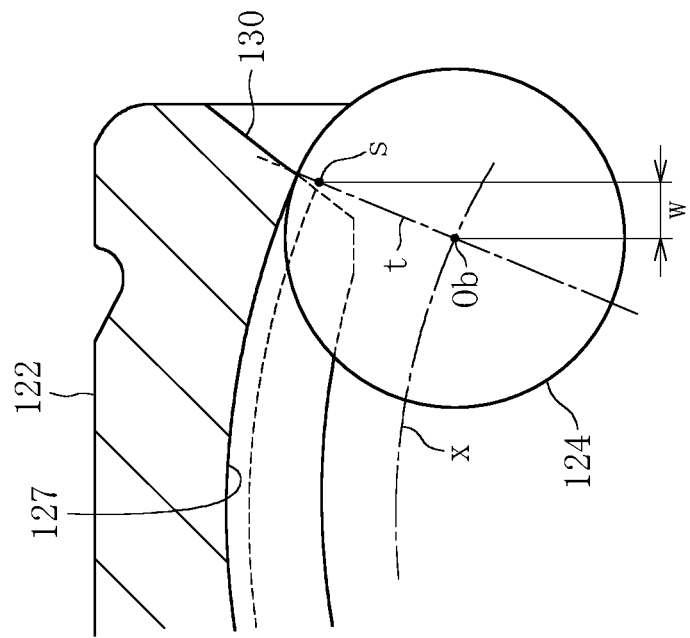
FIG. 23b is a partially enlarged view of the fixed type constant velocity universal joint.
Figure 23A:
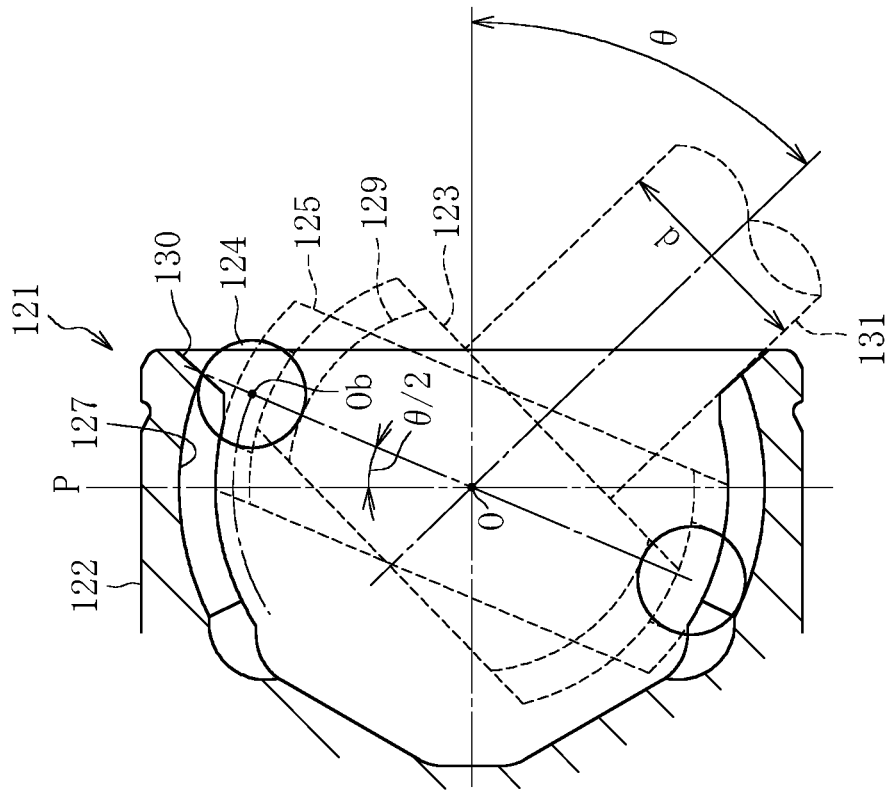
FIG. 23a is a vertical sectional view of the related-art fixed type constant velocity universal joint.

Further, referring to FIG. 7, detailed description is given of the contact state between the track groove and the ball at the time when the constant velocity universal joint according to this embodiment forms the maximum operating angle. FIG. 7a is a vertical sectional view of the constant velocity universal joint 1, and FIG. 7b is an enlarged view of the contact state between the track groove 7A of the outer joint member 2 and the ball 4. FIGS. 7a and 7b also illustrate the track groove 7A of the outer joint member 2, and the illustration and description of the track groove 7B are omitted because the inclination direction of the track groove 7B is opposite to that of the track groove 7A and other structural details of the track groove 7B are the same as those of the track groove 7A. When the joint forms the maximum operating angle $\theta_{max}$ as illustrated in FIG. 7a, a center Ob of the ball 4 moves to a position corresponding to $\theta_{max}/2$ with respect to the plane P including the joint center O at the operating angle of 0°. At this time, a contact point S between the ball 4 and the second track groove portion 7Ab becomes closest to the inlet chamfer 10. The straight ball raceway center line Xb of the second track groove portion 7Ab is connected, as a tangential line, to the end portion A of the arc-shaped ball raceway center line Xa of the first track groove portion 7Aa, and hence, in the vertical cross section of FIG. 7a, the straight ball raceway center line Xb is inclined in a direction of approaching the joint axial line N-N as the distance to the opening side of the outer joint member 2 becomes smaller. As illustrated in the enlarged view of FIG. 7b, the contact point S between the ball 4 and the track groove portion 7Ab is positioned on a plane T passing through the center Ob of the ball 4 and perpendicular to the ball raceway center line Xb. The ball raceway center line Xb has the straight shape, and hence an axial distance w between the center Ob of the ball 4 and the contact point S is smaller than that of the related-art constant velocity universal joint illustrated in FIG. 23b, with the result that the effective track length is increased accordingly. Therefore, in this embodiment, a track allowance amount U can be secured between the edge portion of the inlet chamfer 10 and the contact point S at the maximum operating angle, and hence a sufficient contact state can be secured between the ball 4 and the track groove portion 7Ab.

Figure 8B:
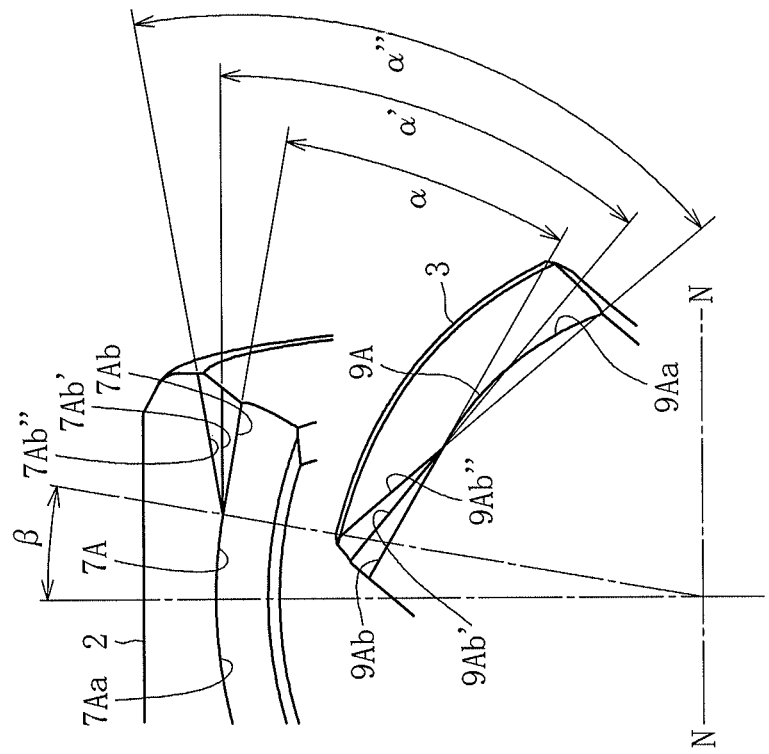
FIG. 8b is a view of changes in wedge angle.
Figure 8A:
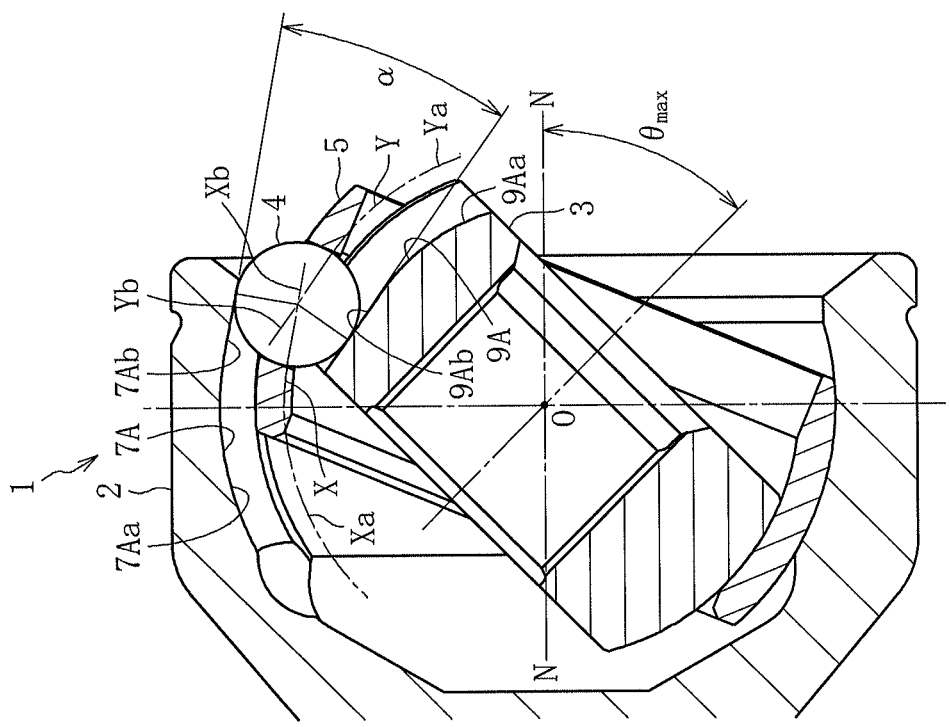
FIG. 8a is a view of a wedge angle in a state in which the joint forms the maximum operating angle.
Figure 19B:
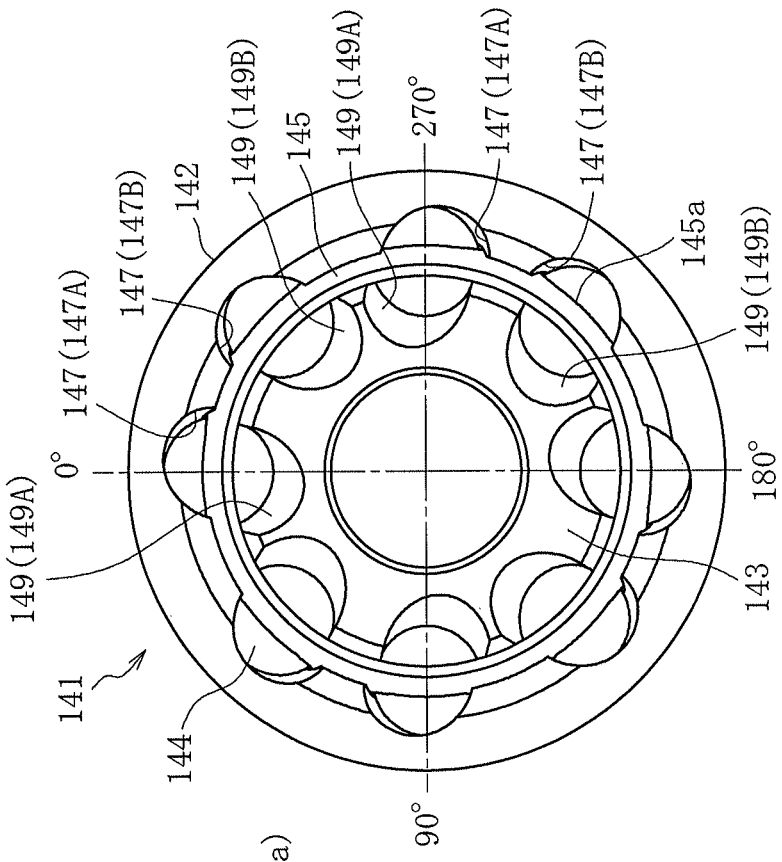
FIG. 19b is a side view of the fixed type constant velocity universal joint.
Figure 19A:
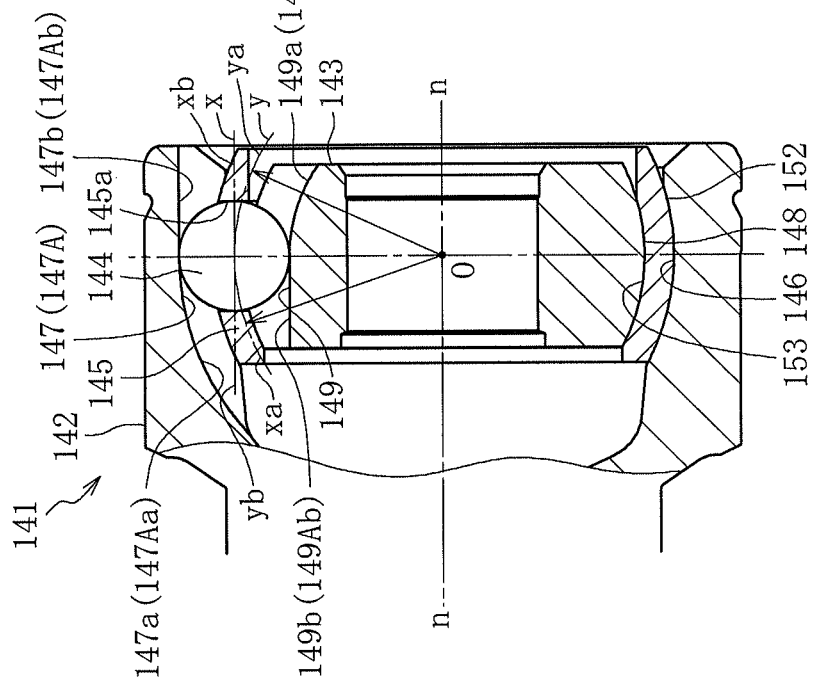
FIG. 19a is a vertical sectional view of a fixed type constant velocity universal joint, for illustrating technical findings in the process to arrive at the present invention.
Figure 20:
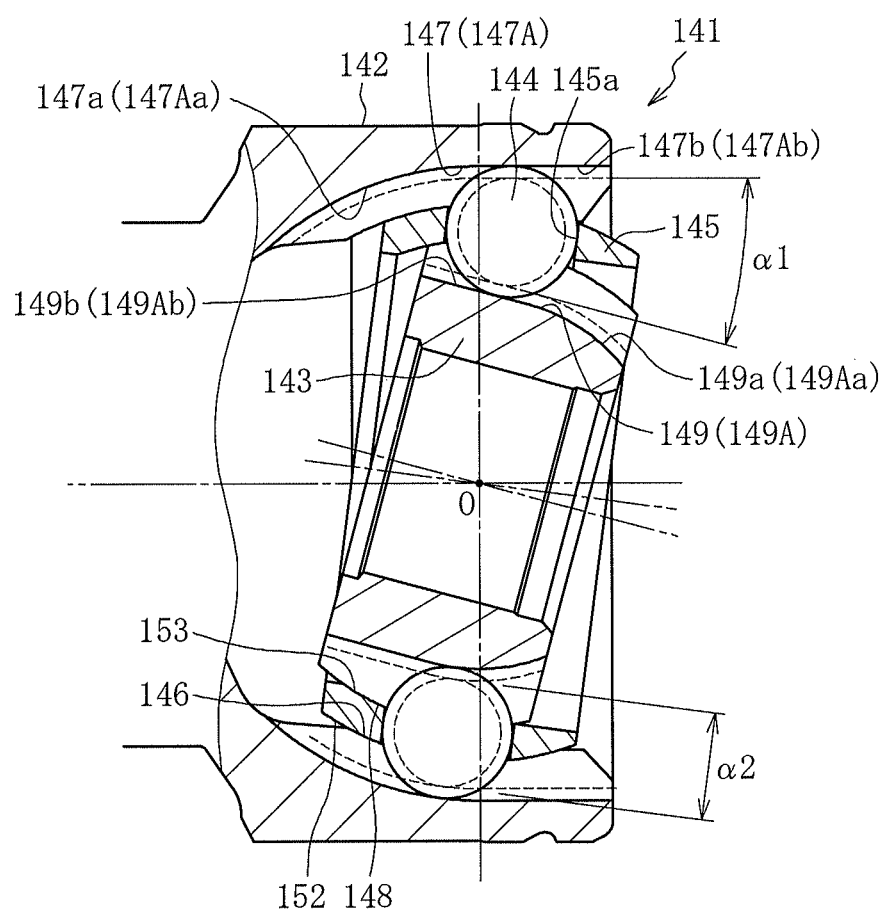
FIG. 20 is a view illustrating the technical findings in the process to arrive at the present invention.
Figure 21A:
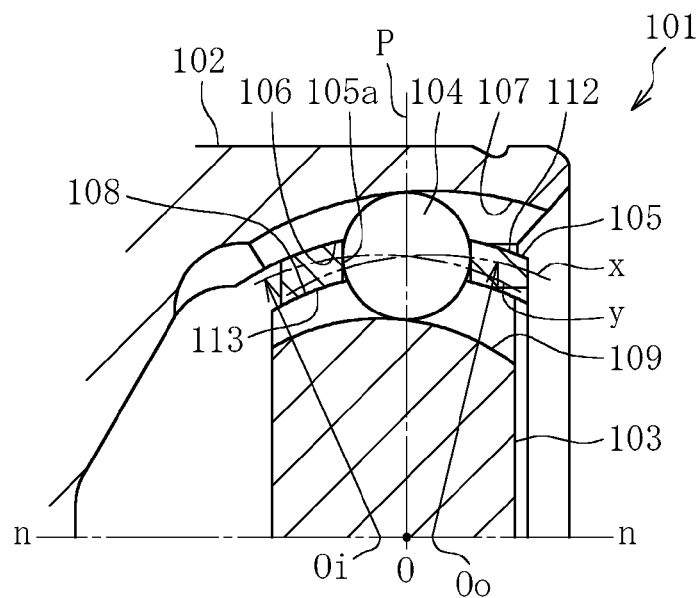
FIG. 21a is a vertical sectional view of a related-art fixed type constant velocity universal joint.
Figure 21B:
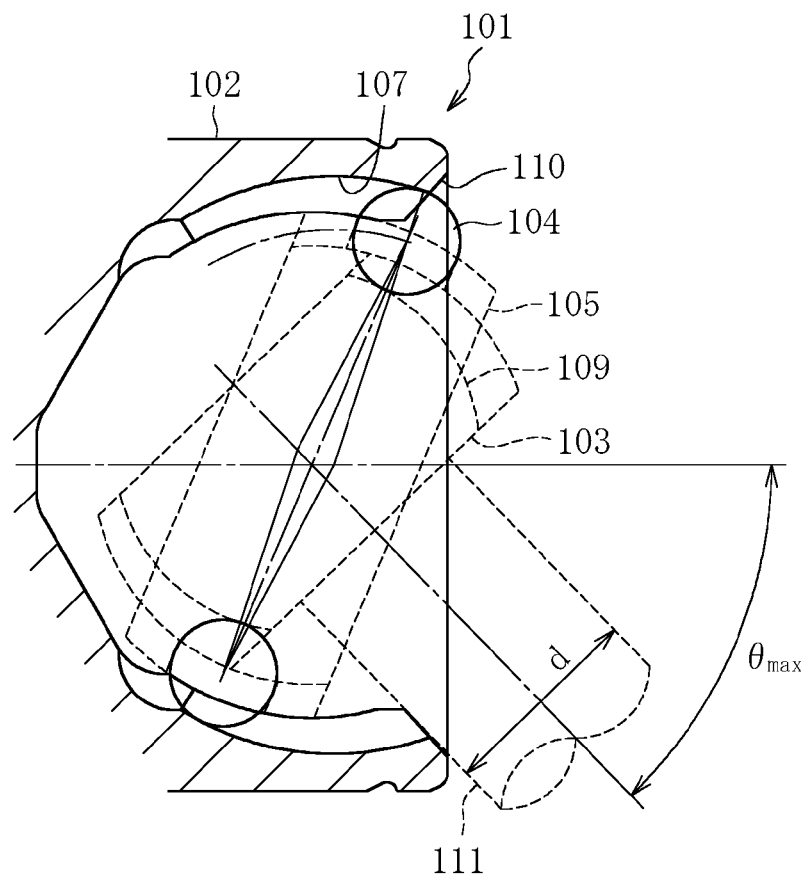
FIG. 21b is a view of a state in which the fixed type constant velocity universal joint forms the maximum operating angle.
Figure 22:
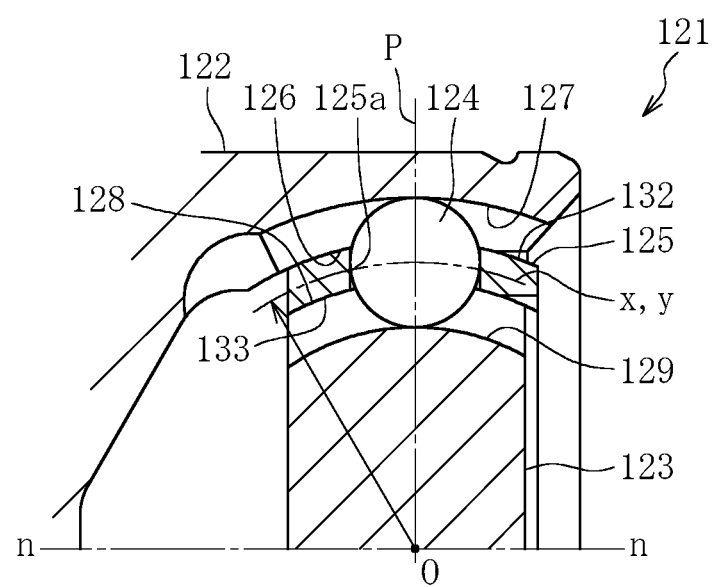
FIG. 22 is a vertical sectional view of another related-art fixed type constant velocity universal joint.

Next, referring to FIG. 8, description is given of a state of the wedge angle at the maximum operating angle, which is a remarkable feature of the constant velocity universal joint according to this embodiment. FIG. 8a is a vertical sectional view of the constant velocity universal joint 1, and FIG. 8(b) is an enlarged view of the state of the wedge angle between the track groove 7A (7Ab) of the outer joint member 2 and the track groove 9A (9Ab) of the inner joint member 3. FIGS. 8a and 8b also illustrate the track groove 7A of the outer joint member 2, and the illustration and description of the track groove 7B are omitted because the inclination direction of the track groove 7B is opposite to that of the track groove 7A and other structural details of the track groove 7B are the same as those of the track groove 7A. In the constant velocity universal joint 1 according to this embodiment, the track grooves 7A and 9A are held in angular contact with the ball 4 at a contact angle, and the ball raceway center lines X and Y of the track grooves 7A and 9A each have the inclination angle γ (see FIGS. 2a and 3b). Therefore, the wedge angle between the track grooves herein refers to an actual wedge angle formed at the contact points between the ball and the track grooves. In FIGS. 8a and 8b, however, the wedge angle is simply represented by the groove bottoms of the track grooves 7A and 9A. As illustrated in FIG. 8a, a wedge angle α between the track grooves 7A and 9A at the time when the constant velocity universal joint 1 according to this embodiment forms the maximum operating angle $\theta_{max}$ becomes highest when the phase angle in the rotational direction is 300° to 360° (see FIG. 19b). The straight ball raceway center line Xb of the second track groove portion 7Ab of the outer joint member 2 is connected, as a tangential line, to the end portion A of the arc-shaped ball raceway center line Xa of the first track groove portion 7Aa, and hence, in the vertical cross section of FIG. 8a, the straight ball raceway center line Xb at the operating angle of 0° is inclined in the direction of approaching the joint axial line N-N as the distance to the opening side of the outer joint member 2 becomes smaller. On the other hand, the straight ball raceway center line Yb of the second track groove portion 9Ab of the inner joint member 3 is inclined in an opposite direction to that of the straight ball raceway center line Xb of the outer joint member 2. Thus, the second track groove portions 7Ab and 9Ab at the operating angle of 0° are formed so as to be narrower on the opening side. Therefore, the wedge angle α at the maximum operating angle can be decreased. As a result, a force for causing the ball 4 interposed between the straight second track groove portions 7Ab and 9Ab to jump toward the opening side is decreased, and the pocket load of the cage 5 is decreased, with the result that the strength of the cage 5 can be secured at high operating angles.

Referring to FIG. 8b, specific description is given of the reason why the wedge angle α at the maximum operating angle can be decreased. In FIG. 8b, reference symbols 7Ab and 9Ab represent the second track groove portions of the outer joint member 2 and the inner joint member 3 of the constant velocity universal joint 1 according to this embodiment. In addition, reference symbols 7Ab' and 9Ab' represent second track groove portions according to Comparative Example 1 for investigation, and reference symbols 7Ab" and 9Ab" represent second track groove portions according to Comparative Example 2 for investigation. In the constant velocity universal joint 1 according to this embodiment, as described above, the second track groove portions 7Ab and 9Ab at the operating angle of 0° are formed so as to be narrower on the opening side. Therefore, the wedge angle at the maximum operating angle is decreased to α accordingly. In contrast, in Comparative Example 1, in the sectional view of FIG. 8(b), the groove bottoms of the second track groove portion 7Ab' and 9Ab' at the operating angle of 0° are formed in parallel to each other. Therefore, the wedge angle at the maximum operating angle is increased to α'. Further, in Comparative Example 2, the groove bottoms of the second track groove portion 7Ab" and 9Ab" are formed away from each other as the distance to the opening side of the outer joint member 2 becomes smaller. Therefore, the wedge angle at the maximum operating angle is further increased to α". In this manner, in the constant velocity universal joint 1 according to this embodiment, the wedge angle α at the maximum operating angle can be set lower than those of Comparative Examples 1 and 2. As described above, the effective track length is larger in Comparative Examples 1 and 2, but in the practical use of the fixed type constant velocity universal joint, this embodiment is preferred because the effective track length at the maximum operating angle can be secured and the increase in wedge angle can be suppressed at the same time.

FIG. 9 are perspective views of the outer joint member 2 and the inner joint member 3 of the constant velocity universal joint according to this embodiment. Those perspective views illustrate the above-mentioned track grooves in a three-dimensional manner. As illustrated in FIG. 9a, the track grooves 7A and 7B inclined in the peripheral direction with respect to the joint axial line N-N (not shown) are alternately formed in the spherical inner peripheral surface 6 of the outer joint member 2 with their inclination directions alternately opposite to each other. Each track groove 7A comprises the first track groove portion 7Aa and the second track groove portion 7Ab, and each track groove 7B comprises the first track groove portion 7Ba and the second track groove portion 7Bb. The inlet chamfer 10 is provided at the opening end of the outer joint member 2. Further, as illustrated in FIG. 9b, the track grooves 9A and 9B inclined in the peripheral direction with respect to the joint axial line N-N (not shown) are alternately formed in the spherical outer peripheral surface 8 of the inner joint member 3 with their inclination directions alternately opposite to each other. Each track groove 9A comprises the first track groove portion 9Aa and the second track groove portion 9Ab, and each track groove 9B comprises the first track groove portion 9Ba and the second track groove portion 9Bb.

Figure 10:
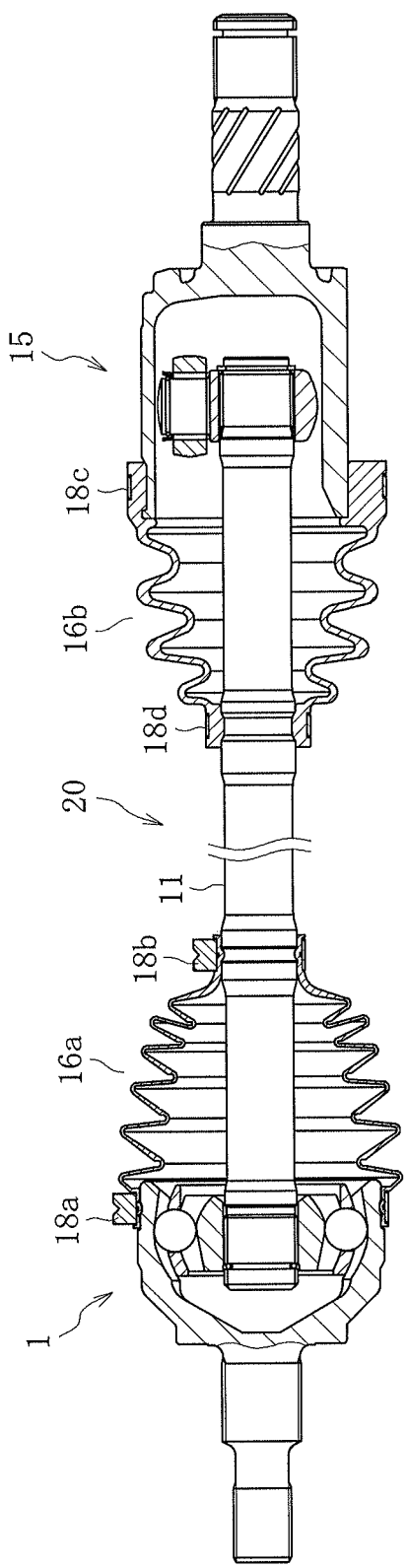
FIG. 10 is a view of a state in which the fixed type constant velocity universal joint is used in an automotive drive shaft.

FIG. 10 illustrates an automotive front drive shaft 20, to which the fixed type constant velocity universal joint 1 according to this embodiment is applied. The fixed type constant velocity universal joint 1 is coupled to one end of an intermediate shaft 11, and a plunging tripod type constant velocity universal joint 15 is coupled to another end thereof. At positions between an outer peripheral surface of the fixed type constant velocity universal joint 1 and an outer peripheral surface of the shaft 11 and between an outer peripheral surface of the plunging tripod type constant velocity universal joint 15 and the outer peripheral surface of the shaft 11, bellows boots 16a and 16b are mounted and fixed with boot bands 18a, 18b, 18c, and 18d, respectively. Grease is sealed inside the joint as a lubricant. Through use of the fixed type constant velocity universal joint 1 according to this embodiment, it is possible to attain a lightweight and compact automotive drive shaft 20 that is suppressed in torque loss and heat generation, enhanced in efficiency, and is capable of forming high operating angles.

Figure 11:
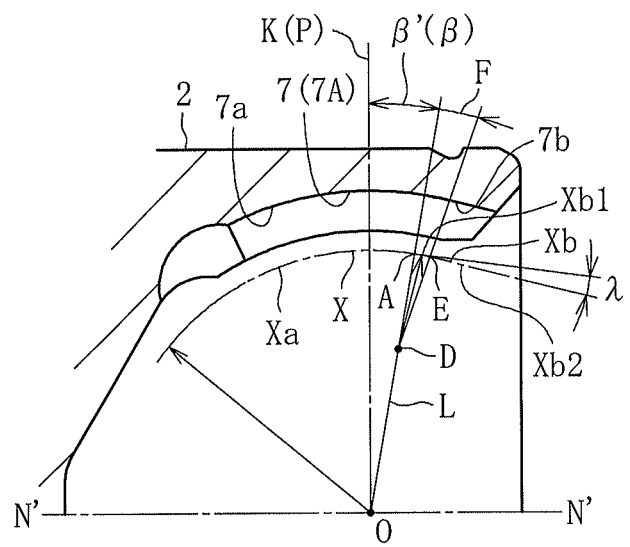
FIG. 11 is a vertical sectional view of an outer joint member of a fixed type constant velocity universal joint according to a second embodiment of the present invention.

Next, a fixed type constant velocity universal joint according to a second embodiment of the present invention is described with reference to FIG. 11. FIG. 11 illustrates only an outer joint member of the fixed type constant velocity universal joint according to this embodiment. FIG. 11 is a sectional view taken along the plane M including the ball raceway center line X of the track groove 7A and the joint center O as in FIG. 4 (see FIG. 2a; the same applies to the corresponding figures in the embodiments described later). Further, FIG. 11 illustrates an upper half of the outer joint member in the radial direction with respect to the axial line. The fixed type constant velocity universal joint according to this embodiment is different from the above-mentioned fixed type constant velocity universal joint according to the first embodiment in that the second track groove portion comprises an arc part and a straight part. Other structural details of this embodiment are the same as those of the first embodiment. The parts having similar functions as those of the first embodiment are represented by the same reference symbols, and redundant description thereof is therefore omitted herein.

The end portion A on the opening side of the ball raceway center line Xa of the first track groove portion 7a of the outer joint member 2 is the same as that of the first embodiment. The ball raceway center line Xb of the second track groove portion 7b comprises an arc-shaped ball raceway center line Xb1 and a straight ball raceway center line Xb2. The arc-shaped ball raceway center line Xb1 is connected to the end portion A on the opening side of the ball raceway center line Xa of the first track groove portion 7a. The curvature radius of the arc-shaped ball raceway center line Xb1 is smaller than the curvature radius of the ball raceway center line Xa of the first track groove portion 7a. The straight ball raceway center line Xb2 is connected, as a tangential line, to an end portion E on the opening side of the arc-shaped ball raceway center line Xb1. Although illustration is omitted, the ball raceway center line Y of the track groove 9 of the inner joint member 3 is formed so as to be mirror-image symmetrical with the ball raceway center line X of the paired track groove 7 of the outer joint member 2 with respect to the plane P including the joint center O at the operating angle of 0°. The curvature radius and an angle range F of the arc-shaped ball raceway center line Xb1 are set appropriately, thereby being capable of changing the inclination angle of the straight ball raceway center line Xb2 of the second track groove portion 7b in the direction of approaching the joint axial line N-N as the distance to the opening side becomes smaller. In this manner, the wedge angle α at the maximum operating angle can be adjusted appropriately. As illustrated in FIG. 11, in this embodiment, the inclination angle in the direction of approaching the axial line N-N is increased by an angle λ as compared to the first embodiment. The inclined state of the track grooves 7 and 9 of the outer joint member 2 and the inner joint member 3 in the peripheral direction with respect to the joint axial line N-N, the structure of the cage 5, and the actions of the joint are similar to those of the fixed type constant velocity universal joint according to the first embodiment, and redundant description thereof is therefore omitted herein.

Figure 12:
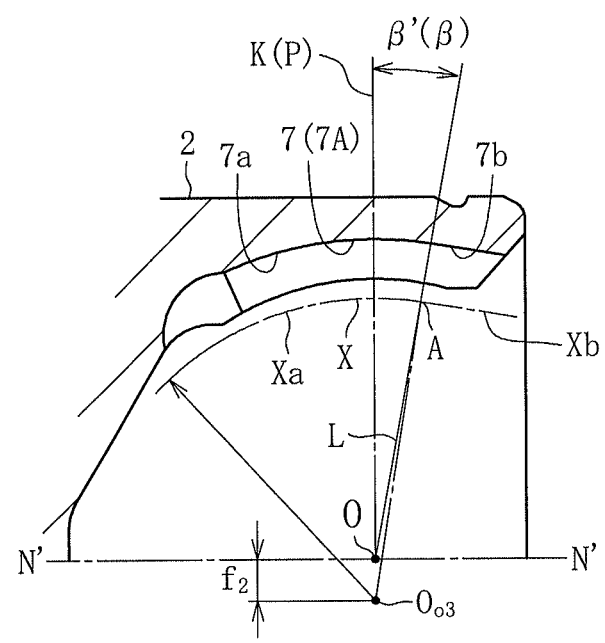
FIG. 12 is a vertical sectional view of an outer joint member of a fixed type constant velocity universal joint according to a third embodiment of the present invention.

A fixed type constant velocity universal joint according to a third embodiment of the present invention is described with reference to FIG. 12. FIG. 12 also illustrates only an outer joint member of the fixed type constant velocity universal joint according to this embodiment. The fixed type constant velocity universal joint according to this embodiment is different from the above-mentioned fixed type constant velocity universal joint according to the first embodiment in that the curvature center of the arc-shaped ball raceway center line of the first track groove portion is offset in the radial direction with respect to the joint axial line N-N, and accordingly, the structure of the straight ball raceway center line of the second track groove portion is adjusted. Other structural details of this embodiment are the same as those of the first embodiment. Also in this embodiment, the parts having similar functions as those of the first embodiment are represented by the same reference symbols, and redundant description thereof is therefore omitted herein. The same applies to the embodiments described later.

The end portion A on the opening side of the ball raceway center line Xa of the first track groove portion 7a of the outer joint member 2 is the same as that of the first embodiment. A curvature center $O_{o3}$ of the ball raceway center line Xa of the first track groove portion 7a is not offset in the axial direction with respect to the joint center O, but is offset, however, by $f_2$ in the radial direction with respect to the joint axial line. Along with this, the straight ball raceway center line Xb of the second track groove portion 7b is adjusted to be connected, as a tangential line, to the end portion A on the opening side of the ball raceway center line Xa of the first track groove portion 7a. With this structure, the track groove depths on the interior side of the joint can be adjusted. Also in the fixed type constant velocity universal joint according to this embodiment, although illustration is omitted, the ball raceway center line Y of the track groove 9 of the inner joint member 3 is formed so as to be mirror-image symmetrical with the ball raceway center line X of the paired track groove 7 of the outer joint member 2 with respect to the plane P including the joint center O at the operating angle of 0°. The inclined state of the track grooves 7 and 9 of the outer joint member 2 and the inner joint member 3 in the peripheral direction with respect to the joint axial line N-N, the structure of the cage 5, and the actions of the joint are similar to those of the fixed type constant velocity universal joint according to the first embodiment, and redundant description thereof is therefore omitted herein.

A fixed type constant velocity universal joint according to a fourth embodiment of the present invention is described with reference to FIG. 13. The fixed type constant velocity universal joint according to this embodiment is different from the fixed type constant velocity universal joint according to the first embodiment in that the curvature centers of the spherical outer peripheral surface and the spherical inner peripheral surface of the cage are offset in the axial direction with respect to the joint center O. Other structural details of this embodiment are the same as those of the first embodiment.

Figure 13A:
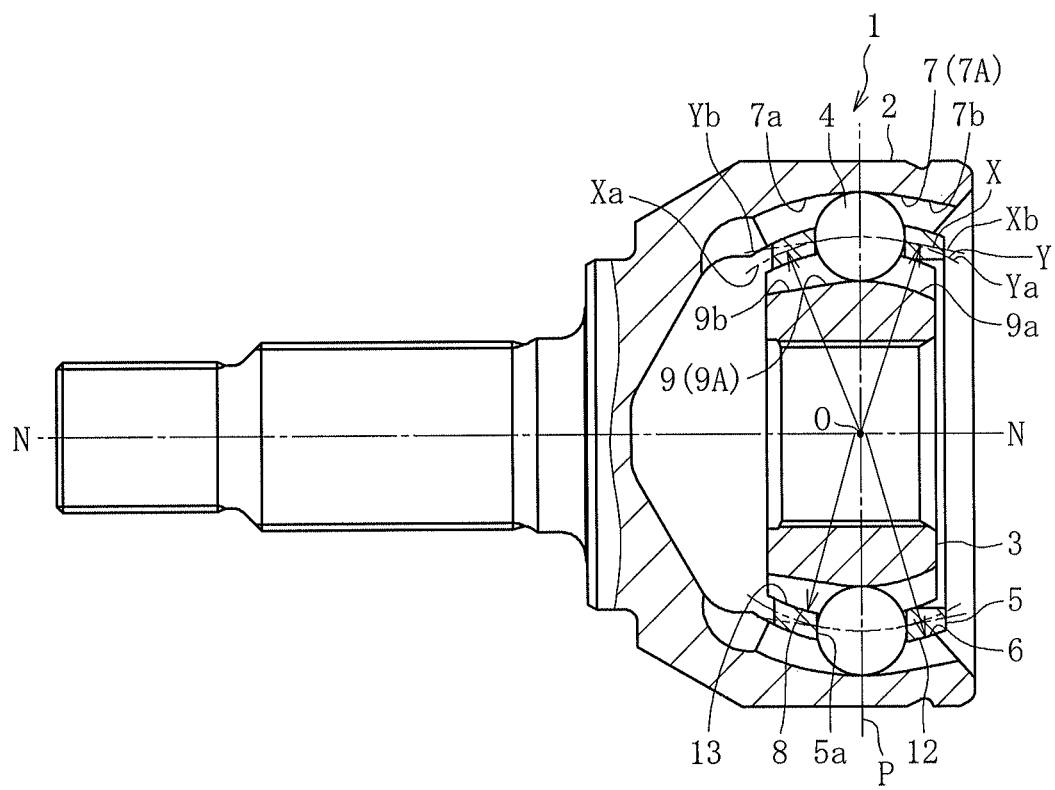
FIG. 13a is a partial vertical sectional view of a fixed type constant velocity universal joint according to a fourth embodiment of the present invention.
Figure 13B:
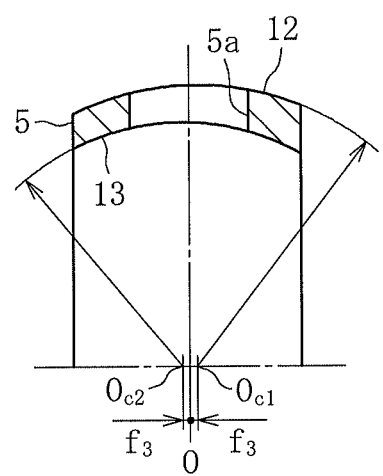
FIG. 13b is a vertical sectional view of a cage of the fixed type constant velocity universal joint.

FIG. 13a is a partial vertical sectional view of the fixed type constant velocity universal joint, and FIG. 13b is a vertical sectional view of the cage. A curvature center $O_{c1}$ of the spherical outer peripheral surface 12 of the cage 5 and a curvature center $O_{c2}$ of the spherical inner peripheral surface 13 of the cage 5 are each offset by $f_3$ in the axial direction with respect to the joint center O. With this offset structure, the thickness of the cage 5 is increased as the distance to the opening side becomes smaller, with the result that the strength of the cage 5 can be enhanced particularly at high operating angles. As described above, in the range of high operating angles, the balls 4 arranged in the peripheral direction are temporarily separately positioned between the first track groove portions 7Aa and 9Aa (7Ba and 9Ba; see FIGS. 2a and 3b) and between the second track groove portions 7Ab and 9Ab (7Bb and 9Bb; see FIGS. 2a and 3b). In this case, the pressing forces toward the opening side are applied from the balls 4 positioned between the second track groove portions 7Ab and 9Ab (7Bb and 9Bb) to the pocket portions 5a of the cage 5. However, the thickness of the cage 5 is increased as the distance to the opening side becomes smaller, with the result that the strength of the cage 5 can be enhanced. Further, the track groove depths of the track groove portions 7a and 9b on the interior side can be increased. Also in this embodiment, the inclined state of the track grooves 7 and 9 of the outer joint member 2 and the inner joint member 3 in the peripheral direction with respect to the joint axial line N-N, the structure of the cage 5, and the actions of the joint are similar to those of the fixed type constant velocity universal joint according to the first embodiment, and redundant description thereof is therefore omitted herein.

A fixed type constant velocity universal joint according to a fifth embodiment of the present invention is described with reference to FIGS. 14 to 18. The fixed type constant velocity universal joint according to this embodiment is different from the fixed type constant velocity universal joint according to the first embodiment in the structure of the second track groove portion. Other structural details of this embodiment are the same as those of the first embodiment.

Figure 14:
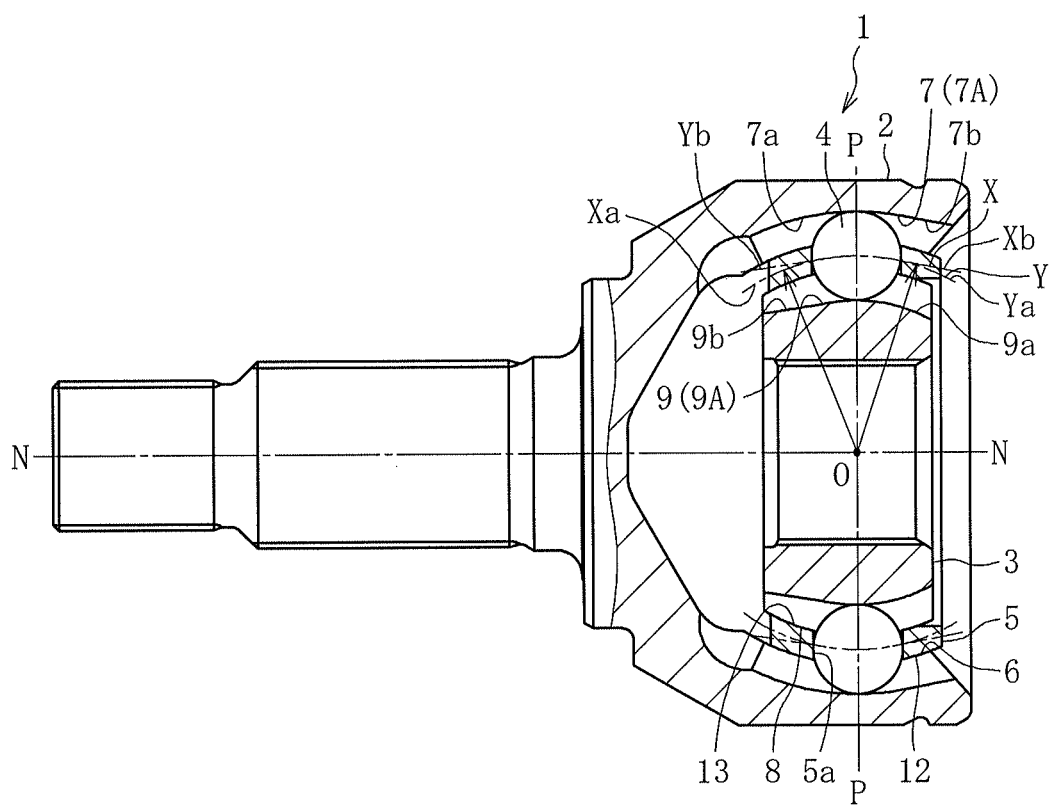
FIG. 14 is a partial vertical sectional view of a fixed type constant velocity universal joint according to a fifth embodiment of the present invention.

As illustrated in FIG. 14, the vertical sectional shape of the fixed type constant velocity universal joint according to this embodiment, including the shape of the second track groove portion, is substantially similar to that of the first embodiment. That is, each track groove 7 of the outer joint member 2 has the ball raceway center line X. The track groove 7 comprises the first track groove portion 7a having the arc-shaped ball raceway center line Xa about the joint center O defined as a curvature center, and the second track groove portion 7b having the ball raceway center line Xb formed into a straight shape when being projected onto the plane M including the ball raceway center line Xa of the first track groove portion 7a and the joint center O (see FIG. 17). The ball raceway center line Xb of the second track groove portion 7b is smoothly connected to the ball raceway center line Xa of the first track groove portion 7a as a tangential line. On the other hand, each track groove 9 of the inner joint member 3 has the ball raceway center line Y. The track groove 9 comprises the first track groove portion 9a having the arc-shaped ball raceway center line Ya about the joint center O defined as a curvature center, and the second track groove portion 9b having the ball raceway center line Yb formed into a straight shape when being projected onto the plane Q including the ball raceway center line Ya of the first track groove portion 9Aa and the joint center O (see FIG. 18). The ball raceway center line Yb of the second track groove portion 9b is smoothly connected to the ball raceway center line Ya of the first track groove portion 9a as a tangential line.

Figure 15:
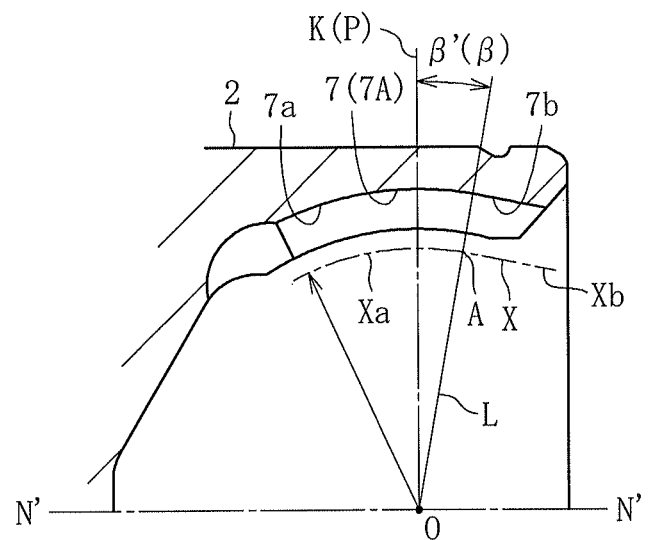
FIG. 15 is a vertical sectional view of an outer joint member of the fixed type constant velocity universal joint.
Figure 16:
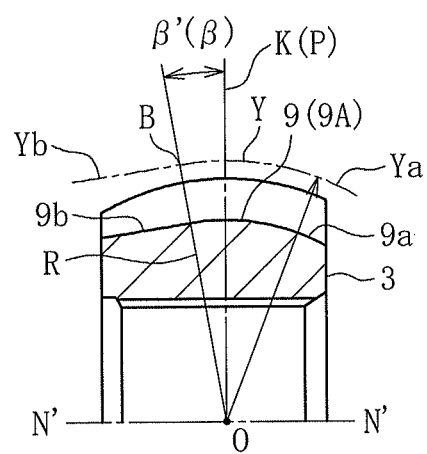
FIG. 16 is a vertical sectional view of an inner joint member of the fixed type constant velocity universal joint.

As illustrated in FIG. 15, the shape in the region up to the end portion A on the opening side of the ball raceway center line Xa of the first track groove portion 7a of the outer joint member 2 is the same as that of the first embodiment. However, the ball raceway center line Xb of the second track groove portion 7b is different from that of the first embodiment. The ball raceway center line Xb of the second track groove portion 7b of the outer joint member 2 according to this embodiment is formed into a straight shape when being projected onto the plane M including the ball raceway center line Xa of the first track groove portion 7a and the joint center O (see FIG. 17), but is formed so that the ball raceway center line Xb is smoothly connected to the end portion A on the opening side of the ball raceway center line Xa of the first track groove portion 7a, then gently curved to have a gradually decreasing inclination angle γ as the distance to the opening side becomes smaller, and is extended to have an inclination angle γ of 0° in the vicinity of the opening end portion. The same applies to the ball raceway center line Yb of the second track groove portion 9b of the inner joint member 3 illustrated in FIG. 16. The ball raceway center line Y of the track groove 9 of the inner joint member 3 is formed so as to be mirror-image symmetrical with the ball raceway center line X of the paired track groove 7 of the outer joint member 2 with respect to the plane P including the joint center O at the operating angle of 0°.

Figure 17:
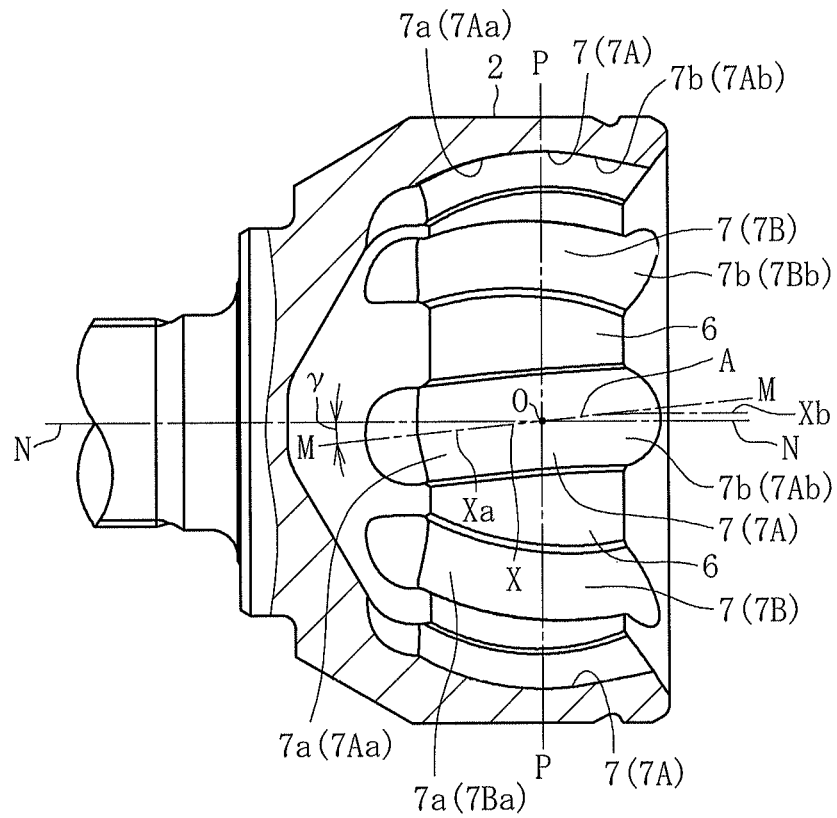
FIG. 17 is a partial vertical sectional view of an inner peripheral shape of the outer joint member of the fixed type constant velocity universal joint.

Referring to FIG. 17, description is given of the state in which the track grooves 7 of the outer joint member 2 are inclined in the peripheral direction with respect to the joint axial line N-N. The plane M including the ball raceway center line Xa of the first track groove portion 7Aa of the outer joint member 2 and the joint center O is inclined at the angle γ with respect to the joint axial line N-N. In addition, in the case of the first track groove portion 7Ba adjacent to the first track groove portion 7Aa in the peripheral direction, although illustration is omitted, the plane M including the ball raceway center line Xa of the first track groove portion 7Ba and the joint center O is inclined at the angle γ with respect to the joint axial line N-N in the opposite direction to the inclination direction of the first track groove portion 7Aa. As described above, in this embodiment, only the first track groove portions 7Aa and 7Ba are formed in the plane M. Further, as described above, in this embodiment, the ball raceway center line Xb of the second track groove portion 7Ab is formed so that the ball raceway center line Xb is smoothly connected to the end portion A on the opening side of the ball raceway center line Xa of the first track groove portion 7Aa, then gently curved to have a gradually decreasing inclination angle γ as the distance to the opening side becomes smaller, and is extended to have an inclination angle γ of 0° in the vicinity of the opening end portion. The ball raceway center line Xb of the second track groove portion 7Bb, which is inclined in the opposite direction, is formed in a similar manner.

Figure 18:
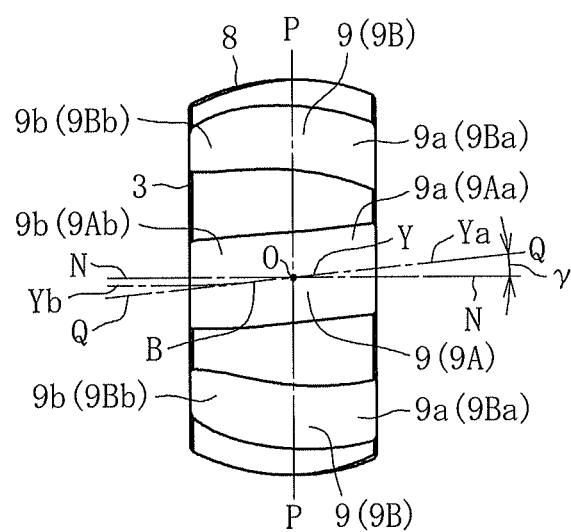
FIG. 18 is a view of an outer peripheral shape of the inner joint member of the fixed type constant velocity universal joint.

Referring to FIG. 18, description is given of the state in which the track grooves 9 of the inner joint member 3 are inclined in the peripheral direction with respect to the joint axial line N-N. The plane Q including the ball raceway center line Ya of the first track groove portion 9Aa of the inner joint member 3 and the joint center O is inclined at the angle γ with respect to the joint axial line N-N. In addition, in the case of the first track groove portion 9Ba adjacent to the first track groove portion 9Aa in the peripheral direction, although illustration is omitted, the plane Q including the ball raceway center line Ya of the first track groove portion 9Ba and the joint center O is inclined at the angle γ with respect to the joint axial line N-N in the opposite direction to the inclination direction of the first track groove portion 9Aa. As in the track groove of the outer joint member 2 described above, the ball raceway center line Yb of the second track groove portion 9Ab of the inner joint member 3 is formed so that the ball raceway center line Yb is smoothly connected to the end portion B on the interior side of the ball raceway center line Ya of the first track groove portion 9Aa, then gently curved to have a gradually decreasing inclination angle γ as the distance to the interior side becomes smaller, and is extended to have an inclination angle γ of 0° in the vicinity of the interior-side end portion. Note that, the ball raceway center line Yb of the second track groove portion 9Bb, which is inclined in the opposite direction, is formed in a similar manner.

The second track groove portions 7Ab and 7Bb of the outer joint member 2 and the second track groove portions 9Ab and 9Bb of the inner joint member 3 are formed as described above. Therefore, the interval on the approaching side is increased between the second track groove portions 7Ab and 7Bb, which are adjacent to each other in the peripheral direction, and the interval on the approaching side is also increased between the second track groove portions 9Ab and 9Bb, which are adjacent to each other in the peripheral direction. Thus, differences in intervals can be decreased in the peripheral direction. As a result, a difference in contact area on the opening side between the respective regions of the spherical inner peripheral surface 6 of the outer joint member 2 and a difference in contact area on the interior side between the respective regions of the spherical outer peripheral surface 8 of the inner joint member 3 can be decreased, and hence the spherical contact portions between the cage 5 and the outer joint member 2 and between the cage 5 and the inner joint member 3 can be arranged in a balanced manner. Thus, the fixed type constant velocity universal joint can be operated more smoothly.

In the fifth embodiment described above, the ball raceway center line Xb of each of the second track groove portions 7Ab and 7Bb of the outer joint member 2 is formed so that the ball raceway center line Xb is smoothly connected to the end portion A on the opening side of the ball raceway center line Xa of each of the first track groove portions 7Aa and 7Ba, then gently curved to have a gradually decreasing inclination angle γ as the distance to the opening side becomes smaller, and is extended to have an inclination angle γ of 0° in the vicinity of the opening end portion. On the other hand, the ball raceway center line Yb of each of the second track groove portions 9Ab and 9Bb of the inner joint member 3 is formed so that the ball raceway center line Yb is smoothly connected to the end portion B on the interior side of the ball raceway center line Ya of each of the first track groove portions 9Aa and 9Ba, then gently curved to have a gradually decreasing inclination angle γ as the distance to the opening side becomes smaller, and is extended to have an inclination angle γ of 0° in the vicinity of the interior-side end portion. However, the present invention is not limited thereto. That is, the ball raceway center line Xb of each of the second track groove portions 7Ab and 7Bb of the outer joint member 2 may be formed so that the ball raceway center line Xb is connected, in a shape of an arc having a relatively small curvature radius, to the end portion A on the opening side of the ball raceway center line Xa of each of the first track groove portions 7Aa and 7Ba and then extended to have an inclination angle γ of 0° on the opening side. Similarly, the ball raceway center line Yb of each of the second track groove portions 9Ab and 9Bb of the inner joint member 3 may be formed so that the ball raceway center line Yb is connected, in a shape of an arc having a relatively small curvature radius, to the end portion B on the interior side of the ball raceway center line Ya of each of the first track groove portions 9Aa and 9Ba and then extended to have an inclination angle γ of 0° on the interior side.

In the fixed type constant velocity universal joint according to the embodiments described above, the number of the balls 4 is set to eight. However, the present invention is not limited thereto. Ten balls are also preferred, and twelve balls may also be applicable appropriately.

Further, in the fixed type constant velocity universal joint according to the embodiments described above, the first track groove portion is not limited to a single arc, but may be formed of a plurality of arcs in consideration of the track groove depths and the like. Still further, the track grooves are arranged at a regular pitch in the peripheral direction, but may be arranged at an irregular pitch. Still further, the inclination angles γ of the first track groove portions with respect to the joint axial line N-N are equal to each other in all the track grooves, but the present invention is not limited thereto. Alternatively, the inclination angle γ of a pair of the first track groove portions of the outer joint member and the inner joint member may be formed so as to be unequal to the inclination angle γ of another pair of the first track groove portions thereof. That is, it is only necessary that the inclination angles be set so that the axial forces of the balls are applied in a balanced manner as a whole to all the pocket portions of the cage in the peripheral direction. In addition, the track grooves and the balls are held in angular contact at a contact angle in the embodiments described above, but the present invention is not limited thereto. The track grooves and the balls may be held in circular contact by forming the track grooves into a circular shape in horizontal cross section.

The present invention is not limited to the embodiments described above, and as a matter of course, may be carried out in various other embodiments without departing from the spirit of the present invention. The scope of the present invention is defined in the claims, and encompasses meaning of equivalents of elements described in the claims and all modifications within the scope of claims.

DESCRIPTION OF REFERENCE SIGNS 1 fixed type constant velocity universal joint
2 outer joint member
3 inner joint member
4 ball
5 cage
6 spherical inner peripheral surface
7 track groove
7a first track groove portion
7b second track groove portion
8 spherical outer peripheral surface
9 track groove
9a first track groove portion
9b second track groove portion
11 shaft
12 spherical outer peripheral surface
13 spherical inner peripheral surface
20 drive shaft
A end portion
B end portion
$f_2$ offset amount
$f_3$ offset amount
K perpendicular line
L straight line
M plane including ball raceway center line
N joint axial line
O joint center
P joint center plane
Q plane including ball raceway center line
$O_{c1}$ curvature center
$O_{c2}$ curvature center
$O_{c3}$ curvature center
R straight line
X ball raceway center line
Y ball raceway center line
γ inclination angle
β angle
θ operating angle

The invention claimed is:

1. A fixed type constant velocity universal joint, comprising:
an outer joint member having a spherical inner peripheral surface in which a plurality of track grooves are formed so as to extend in an axial direction of the outer joint member,
the outer joint member having an opening side and an interior side spaced apart from each other in the axial direction;
an inner joint member having a spherical outer peripheral surface in which a plurality of track grooves are formed so as to be paired with the plurality of track grooves of the outer joint member;
a plurality of balls for transmitting torque,
the plurality of balls being interposed between the plurality of track grooves of the outer joint member and the plurality of track grooves of the inner joint member; and
a cage for holding the plurality of balls,
the cage having a spherical outer peripheral surface and a spherical inner peripheral surface, which are fitted to the spherical inner peripheral surface of the outer joint member and the spherical outer peripheral surface of the inner joint member, respectively,
wherein the plurality of track grooves of the outer joint member comprise:
first track groove portions positioned on the interior side; and
second track groove portions positioned on the opening side,
wherein each of the first track groove portions comprises an arc-shaped ball raceway center line having a curvature center free from offset in the axial direction with respect to a joint center,
wherein planes each including at least the arc-shaped ball raceway center line of one of the first track groove portions and the joint center are inclined with respect to a joint axial line, the planes of adjacent first track groove portions in a peripheral direction of the outer joint member having inclination directions opposite to each other,
wherein each of the second track groove portions comprises a ball raceway center line having a straight part when being projected onto corresponding one of the planes,
wherein the straight part is formed in an inclined manner to approach the joint axial line as a distance to the opening side becomes smaller,
wherein the arc-shaped ball raceway center line of each of the first track groove portions comprises an end portion positioned on the opening side with respect to the joint center,
wherein the ball raceway center line of each of the second track groove portions is connected to a respective one of the end portions,
wherein each of the plurality of track grooves of the inner joint member comprises a ball raceway center line, which is formed so as to be mirror-image symmetrical with a ball raceway center line of a corresponding one of the plurality of track grooves of the outer joint member with respect to a plane including the joint center at an operating angle of 0°, and
wherein the plurality of balls is at least eight balls.

2. The fixed type constant velocity universal joint according to claim 1, wherein the curvature center of the arc-shaped ball raceway center line of the each of the first track groove portions is arranged on the joint axial line.

3. The fixed type constant velocity universal joint according to claim 1, wherein the curvature center of the arc-shaped ball raceway center line of each of the first track groove portions is offset in a radial direction of the outer joint member with respect to the joint axial line.

4. The fixed type constant velocity universal joint according to claim 1, wherein each of the spherical outer peripheral surface and the spherical inner peripheral surface of the cage has a curvature center offset in the axial direction with respect to the joint center.

5. The fixed type constant velocity universal joint according to claim 1,
wherein an entire region of the ball raceway center line of each of the second track groove portions has a straight shape, and
wherein the ball raceway center line of each of the second track groove portions is formed as a tangential line to the arc-shaped ball raceway center line of a respective one of the first track groove portions.

6. The fixed type constant velocity universal joint according to claim 1,
wherein the ball raceway center line of each of the second track groove portions comprises an arc part having a curvature radius different from a curvature radius of the arc-shaped ball raceway center line of each of the first track groove portions, and
wherein each of the arc parts is connected to the end portion of the arc-shaped ball raceway center line of a respective one of the first track groove portions.

7. The fixed type constant velocity universal joint according to claim 1, wherein an inclination angle of the ball raceway center line of each of the second track groove portions is gradually decreased as the distance to the opening side becomes smaller.

8. The fixed type constant velocity universal joint according to claim 1, wherein the straight part of the ball raceway center line of the each of the second track groove portions is formed in parallel to the joint axial line.

9. The fixed type constant velocity universal joint according to claim 1, wherein an angle formed by a straight line connecting the joint center and the end portion on the opening side of the arc-shaped ball raceway center line of each of the first track groove portions with respect to the plane including the joint center is set to 3° to 10°.

10. The fixed type constant velocity universal joint according to claim 9, wherein the curvature center of the arc-shaped ball raceway center line of each of the first track groove portions is arranged on the joint axial line.

11. The fixed type constant velocity universal joint according to claim 9, wherein the curvature center of the arc-shaped ball raceway center line of each of the first track groove portions is offset in a radial direction of the outer joint member with respect to the joint axial line.

* * * * *